(12) United States Patent
Lash et al.

(10) Patent No.: US 11,568,481 B1
(45) Date of Patent: Jan. 31, 2023

(54) INTELLIGENTLY BUNDLING PAYMENTS

(71) Applicant: Block, Inc., San Francisco, CA (US)

(72) Inventors: Jesse Lash, San Francisco, CA (US); Michael Cormier, San Francisco, CA (US); Taylor Hunt, San Francisco, CA (US); SatAmrit Khalsa, San Francisco, CA (US); Zachary Margolis, San Francisco, CA (US)

(73) Assignee: BLOCK, INC., Oakland, CA (US)

( * ) Notice: Subject to any disclaimer, the term of this patent is extended or adjusted under 35 U.S.C. 154(b) by 302 days.

(21) Appl. No.: 16/259,360

(22) Filed: Jan. 28, 2019

(51) Int. Cl.
*G06Q 40/06* (2012.01)
*G06Q 40/02* (2012.01)
*G06Q 20/22* (2012.01)

(52) U.S. Cl.
CPC ........... *G06Q 40/025* (2013.01); *G06Q 20/29* (2013.01)

(58) Field of Classification Search
CPC ....... G06Q 40/025; G06Q 20/29; G06Q 40/00
See application file for complete search history.

(56) References Cited

U.S. PATENT DOCUMENTS

2005/0203833 A1* 9/2005 Pembroke ............ G06Q 40/025
705/38
2008/0270301 A1* 10/2008 Jones .................. G06Q 20/105
705/41
2013/0226778 A1* 8/2013 Haggerty ............. G06Q 40/025
707/E17.014
2015/0324770 A1* 11/2015 Starikova .............. G06Q 20/24
705/40

FOREIGN PATENT DOCUMENTS

JP      2013077186 A   *  4/2013

OTHER PUBLICATIONS

Craig Vaream, Image Deposit Solutions, Nov. 2005, JP Morgan Chase, web, 1-13 (Year: 2005).*

* cited by examiner

*Primary Examiner* — I Jung Liu
(74) *Attorney, Agent, or Firm* — Mattingly & Malur, PC

(57) ABSTRACT

Intelligent bundling of multiple loans is described. In an example, server computing device(s) can receive a request for a first loan to enable a buyer to purchase a first item from a first merchant and can generate the first loan based at least in part on determining that the buyer purchased the first item. The first loan can be associated with a balance based on an actual purchase price of the first item. The server computing device(s) can determine to bundle repayment of the first loan with at least a second loan, and based on determining to bundle repayment of the first loan and at least the second loan, the server computing device(s) can repay at least a portion of the first loan and at least a portion of the second loan via a single payment from an account of the buyer.

20 Claims, 17 Drawing Sheets

INTELLIGENTLY BUNDLING PAYMENTS

BACKGROUND

Consumers often require (or opt to use) financing to make purchases. For instance, consumers may utilize personal loans and/or lines of credit to purchase items from merchants. A personal loan enables a consumer to receive a lump sum of money at the time the personal loan is generated, and the consumer is expected to repay the loan amount in fixed installments (e.g., daily, monthly, yearly, etc.) for an agreed upon term. Personal loans are fixed debt, such that consumers cannot borrow more than the loan amount without applying for another loan (e.g., via submission of a new loan application). A line of credit, often associated with a credit card or other payment instrument, enables a consumer to borrow money at any time, up to the consumer's credit limit. Consumers can access credit as often as they'd like until they reach their credit limit. Consumers submit payment for the credit to pay off the debt, for instance at the end of the month or over time (wherein a consumer might "carry a balance").

In some examples, consumers can finance via multiple different service providers (e.g., loan service providers, credit service providers, etc.) for multiple purchases and can have multiple loans, open lines of credit, etc. Whether consumers utilize personal loans or lines of credit, consumers must manage repayment to avoid paying interest, penalties, etc.

BRIEF DESCRIPTION OF THE DRAWINGS

The above and other features of the present disclosure, its nature and various advantages, will be more apparent upon consideration of the following detailed description, taken in conjunction with the accompanying drawings, which are briefly described below.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
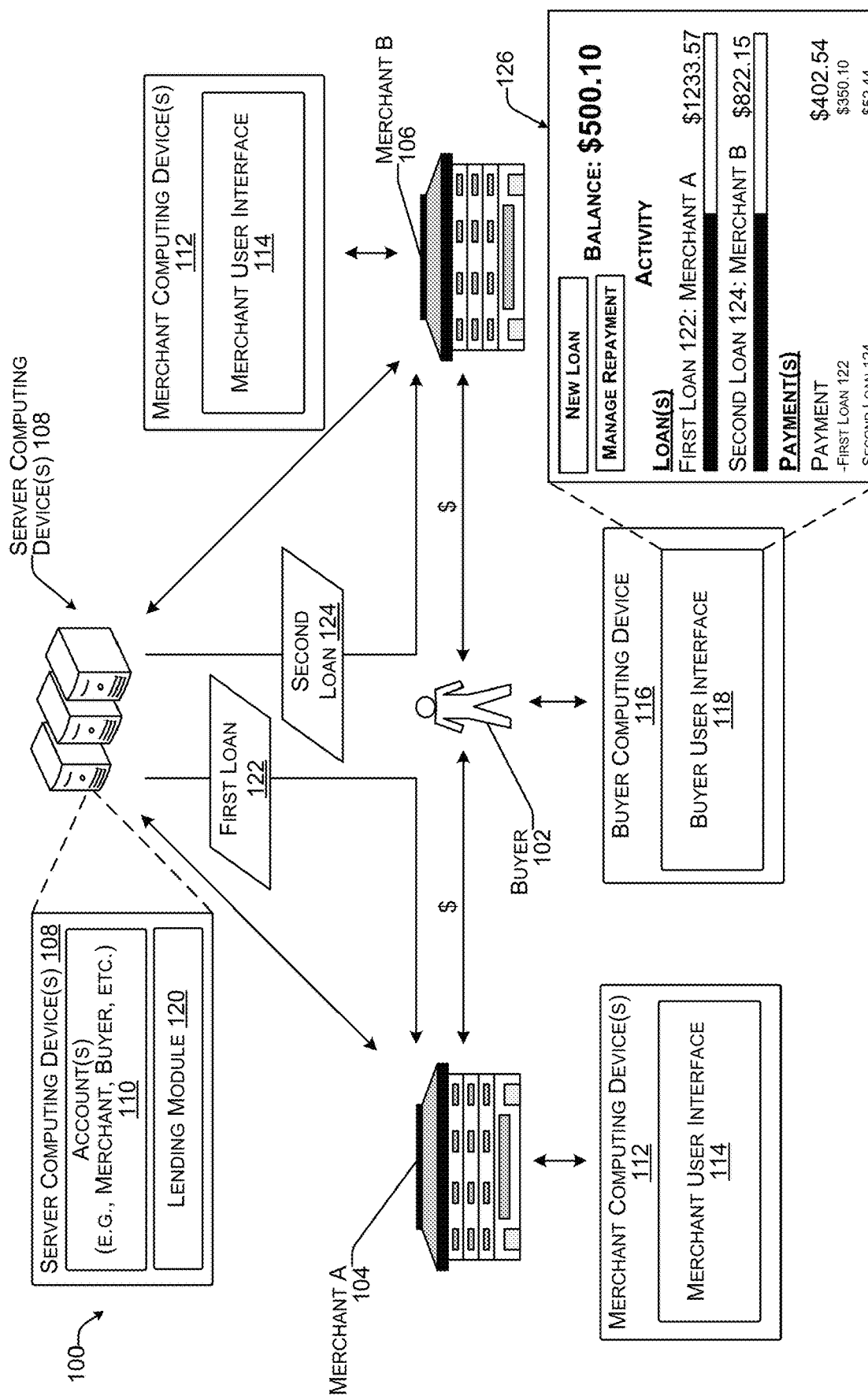
FIG. 1 illustrates an example environment for, among other things, bundling repayment of multiple loans (or other types of debt), such that at least a portion of each bundled loan is repaid via a single payment from an account of a buyer.

Techniques described herein are directed to bundling payments via a distributed system of merchant computing devices and/or buyer computing devices that are in communication with one or more service computing devices of a payment processing service. For instance, techniques described herein are directed to bundling repayment of multiple loans. In an example, multiple loans can be bundled based on one or more aspects. For instance, in an example multiple loans can be bundled based on being associated with a specific payment instrument, a buyer account, a repayment schedule and/or time, repayment terms, and the like.

In at least one example, a buyer can submit a request for a first loan to enable the buyer to purchase a first item from a first merchant associated with the payment processing service. A loan service, which can be associated with the payment processing service, can generate the first loan based at least in part on determining that the buyer purchased or intends to purchase the first item from the first merchant. The first loan can be associated with a balance based on an actual purchase price of the first item. In at least one example, the payment processing service can determine to bundle repayment of the first loan with at least a second loan. In some examples, the second loan can be another loan issued by the loan service to enable the buyer to purchase another item from the first merchant or a second, different merchant associated with the payment processing service. In other examples, the second loan can be another loan issued by an unrelated loan or financing service. Based on determining to bundle repayment of the first loan and at least the second loan, the payment processing service can repay at least a portion of the first loan and at least a portion of the second loan via a single payment from an account of the buyer. In at least one example, the account of the buyer can be associated with a buyer-facing service, or another service, offered by the payment processing service.

As an example, a buyer may have an account with the payment processing service to use a buyer-facing peer-to-peer payment service where the buyer can send and receive funds from other users of the peer-to-peer payment service. In such an example, the buyer can link their account to a bank account or other source of funds and can add funds to a stored (cash) balance associated with the account. When the buyer receives funds from another user, such funds can be added to the stored balance. If the buyer sends funds to another user, such funds can be withdrawn from the stored balance. Further, if the buyer spends funds associated with the stored balance, such funds can be withdrawn from the stored balance.

In some examples, the buyer can request and/or manage loans via a user interface associated with the buyer-facing peer-to-peer payment service. For instance, if the buyer desires to purchase an item from a merchant that is associated with the payment processing service, the buyer can request a loan from the payment processing service via a user interface associated with the buyer-facing peer-to-peer payment service. If the buyer qualifies for the loan, the payment processing service can notify the buyer that they qualify for the loan (and, in some examples, an amount of the loan, terms of the loan, etc.). In at least one example, the loan can be a purchase finance loan for purchasing a particular item at a particular merchant. In some examples, the merchant can subscribe to services associated with the payment processing service; that is, the merchant can be associated with the payment processing service. As described in more detail below, the merchant can utilize the payment processing service for processing point-of-sale (POS) transactions between the merchant and one or more customers. Furthermore, the merchant can utilize the payment processing service for one or more other ancillary services, as described below.

The buyer can purchase the item using the loan and, responsive to the buyer purchasing the item, the payment processing service can generate a loan for the buyer. That is, the payment processing service can disperse the funds to the buyer (or the merchant on behalf of the buyer) and the loan can enter repayment (e.g., loan servicing). The buyer can manage repayment of the loan, and one or more other loans, via the user interface associated with the buyer-facing peer-to-peer payment service. In some examples, the buyer can bundle repayment of two or more loans together. In at least one example, at least a portion of each of the bundled loans can be repaid from the stored balance associated with the account. In additional or alternative examples, at least a portion of each of the bundled loans can be repaid with another source of funds or a combination of such sources (e.g., a bank account, another loan, etc.). In some examples, such payments can be made automatically, without requiring further input from the buyer.

As another example, a buyer may have an account with the payment processing service associated with a delivery service where the buyer is a courier for the delivery service. When the buyer completes a delivery, a delivery fee (and maybe a tip) is added to a stored balance associated with an account of the buyer. In some examples, the buyer can request and/or manage loans via a user interface associated with the delivery service. For instance, if the buyer desires to purchase an item from a merchant that is associated with the payment processing service, the buyer can request a loan from the payment processing service via a user interface associated with the payment service. If the buyer qualifies for the loan, the payment processing service can notify the buyer that they qualify for the loan (and, in some examples, an amount of the loan, terms of the loan, etc.). In at least one example, the loan can be a purchase finance loan for purchasing a particular item at a particular merchant. In some examples, the merchant can subscribe to services associated with the payment processing service; that is, the merchant can be associated with the payment processing service.

The buyer can purchase the item using the loan and, responsive to the buyer purchasing the item, the payment processing service can generate a loan for the buyer. That is, the payment processing service can disperse the funds to the buyer (or the merchant on behalf of the buyer) and the loan can enter repayment (e.g., loan servicing). The buyer can manage repayment of the loan, and one or more other loans, via the user interface associated with the delivery service. In some examples, the buyer can bundle repayment of two or more loans together. In at least one example, at least a portion of each of the bundled loans can be repaid from the stored balance associated with the account (e.g., which is generated at least in part based on delivery service fees paid to the buyer for delivering items to other buyers via the delivery service). In additional or alternative examples, at least a portion of each of the bundled loans can be repaid with another source of funds. In some examples, such payments can be made automatically, without requiring further input from the buyer.

While techniques described herein are directed to "loans," techniques described herein can be applicable to any type of financing method, such as cash advances, loans, credit, and so forth. Moreover, while the aforementioned paragraphs are directed to bundling repayment of loans, techniques described herein can be additionally or alternatively applied to bundle payment more generally, for instance, for paying bills or other debts. That is, while "repayment" of "loans" are described throughout, in some examples, techniques described herein can be applicable to payment of any type of debt, whether it be a loan, a line of credit, an invoice for items rendered, etc. As described above, multiple loans can be bundled based on one or more aspects. For instance, in an example multiple loans can be bundled based on being associated with a specific payment instrument, a buyer account, a repayment schedule and/or time, repayment terms, and the like. In some examples, such aspects can be provided by a buyer or intelligently and/or automatically determined by the payment processing service. As a result, if a buyer has a plurality of loans, a subset of those loans that are associated with a same one or more aspects can be bundled together for repayment.

Techniques described herein are directed to bundling payments via a distributed system of merchant computing devices and/or buyer computing devices that are in communication with one or more service computing devices of a payment processing service. That is, techniques described herein are directed to a specific implementation—or, a practical application—of utilizing a distributed system of merchant computing devices and/or buyer computing devices that are in communication with one or more service computing devices of a payment processing service to generate loans (e.g., on a per-item basis based on intelligent underwriting, as described below) and bundle repayment of such loans (e.g., based on intelligent and/or automatic identification of shared and/or similar loan aspects). As described above, existing technologies associated with loan servicing do not enable multiple loans for different merchants to be bundled together for automatic repayment and further, do not enable a buyer to make a payment for bundled loans from an account managed by a payment processing service on behalf of the buyer. As such, techniques described herein offer an improvement to the technical field of loan servicing and, thus, offer a practical application of bunding multiple loans—from multiple different merchants—together for automatic repayment.

The unconventional configuration of the distributed system described herein enables a remotely-located payment processing service to generate loans for a buyer to use with different merchants and enables the buyer to bundle repayment via an account of the buyer that is maintained by the payment processing service. That is, techniques described herein enable server computing device(s) that are remotely-located from end-users to customize two or more loans to bundle for repayment, which can be made from an account of the buyer that is maintained by the payment processing service. Accordingly, techniques described herein are directed to a specific, discrete implementation of utilizing a distributed system of merchant computing devices and/or buyer computing devices that are in communication with one or more service computing devices of a payment processing service to generate loans and bundle repayment of such loans. Such techniques not only streamline repayment (e.g., a single withdrawal or transfer from the account to remit payment for two or more bundled loans), but techniques described herein provide a particular arrangement of elements that offer technical improvement over conventional techniques for generating and repaying loans (e.g., which are often limited to a one-size-fits-all repayment scheme). Thus, techniques described herein improve an existing technological process.

Furthermore, the distributed system described herein enables the use of merchant data associated with multiple, different merchants and buyer data associated with multiple, different buyers to be aggregated and analyzed to generate loan offers with terms that are customized for particular buyers and/or groups of buyers. That is, techniques described herein enable the remotely-located server computing device(s) to determine financing for eligible buyers for making purchases at certain select merchants based at least partially on information related to past transactions conducted by a plurality of different merchants that use the payment processing system. For instance, techniques described herein are directed to intelligent underwriting of consumer financing based on machine-learning related to buyer purchase behavior and merchant POS information. Such intelligent underwriting permits, in at least one example, the distributed system described to enable buyers to easily obtain financing in a real-time manner (e.g., without working through paperwork and lengthy loan applications) for an item to be purchased in-store while the buyer is at a POS location (e.g., a brick-and-mortar store) of a merchant and/or in association with an ecommerce transaction. Additionally or alternatively, as described herein, techniques described herein enable buyers to approve financing prior to, or after, a transaction has been completed. Furthermore, as described herein, the distributed system enables the payment processing service to determine custom financing terms for buyers based on past purchase activity and/or past financing activity, or such activities of similar buyers/sellers. That is, the distributed system described herein is directed to a practical application of intelligently generating loans for a buyer to use with different merchants and enabling the buyer to bundle repayment via an account of the buyer that is maintained by the payment processing service.

FIG. 1 illustrates an example environment 100 for, among other things, bundling repayment of multiple loans (or other types of debt), such that at least a portion of each bundled loan is repaid via a single payment from an account of a buyer. In environment 100, a buyer 102 interacts with a first merchant, merchant A 104, and a second merchant, merchant B 106. A buyer can be any entity that interacts with merchants to acquire items (e.g., goods, services, etc.) from a merchant. A merchant can be any entity that offers items (e.g., goods, services, etc.) for acquisition (e.g., sale, lease, borrow, free, etc.). Merchants can have physical stores (e.g., brick-and-mortar stores, mobile stores, etc.) and/or online stores (e.g., ecommerce websites). In some examples, merchants can have one or more agents (e.g., employees, independent contractors, etc.) that work for, or on behalf of, the merchants. While a single buyer 102 and two merchants (the merchant A 104 and the merchant B 106) are illustrated in FIG. 1, in practice, multiple buyers and multiple merchants are present in such an environment.

In at least one example, the merchant A 104 and the merchant B 106 can subscribe to services of, or otherwise be associated with, a payment processing service. In at least one example, the merchant A 104 and the merchant B 106 can be different merchants that are associated with the payment processing service. For the purpose of this discussion, "different merchants" can refer to two or more unrelated merchants that are associated with distinct records (e.g., accounts) in the payment processing service. "Different merchants" therefore can refer to two or more merchants that are different legal entities that do not share accounting, employees, branding, etc. "Different merchants," as used herein, have different names, EINs, lines of business (in some examples), inventories (or at least portions thereof) and/or the like. That is, the use of the term "different merchants" does not refer to a merchant with various merchant locations or franchise/franchisee relationships.

The payment processing service can process payment for point-of-sale (POS) transactions between merchants and buyers (e.g., the buyer 102 and the merchant A 104 and/or the merchant B 106). In at least one example, one or more server computing device(s) 108 can be associated with the payment processing service. For the purpose of this discussion, actions attributed to the payment processing service can be performed by functional components of the server computing device(s) 108. Additional details associated with such functional components are described below.

The payment processing service can offer one or more ancillary services (i.e., services in addition to, or as an alternative of, the payment processing services), such as inventory management services, payroll services, financing services (e.g., loan services), peer-to-peer payment services, delivery services, restaurant management services, etc. Users that subscribe to such services, or are otherwise associated with the payment processing service, can be associated with accounts 110, which can be stored and/or managed by the payment processing service. The accounts 110 can be stored in a data structure (e.g., database, data store, etc.) that is stored on the server computing device(s) 108 and/or stored remotely from the server computing device(s) 108 and accessible to the server computing device(s) 108 (e.g., via cloud storage). The accounts 110 can store information associated with merchant(s) (e.g., the merchant A 104, the merchant B 106), buyer(s) (e.g., the buyer 102), etc. For instance, the accounts 110 can store data associated with buyer purchase behavior and merchant POS information, which can be used for executing techniques described herein. Additional details associated with the accounts 110 are described below.

In at least one example, merchants (e.g., the merchant A 104, the merchant B 106) can interact with merchant computing device(s) 112 via respective instances of a merchant user interface 114. While the merchant computing device(s) 112 are shown as being the same for the merchant A 104 and the merchant B 106, the merchant computing device(s) 112 need not be identical. However, in at least one example, the merchant computing device(s) 112 can each have an instance of a merchant user interface 114 to enable the respective merchant (e.g., the merchant A 104 or the merchant B 106) to interact with the merchant computing device(s) 112. The merchant user interface 114 can be presented via a web browser, or the like, via a display of respective merchant computing device(s) 112. In at least one example, the merchant user interface 114 can be presented via an application, such as a mobile application or desktop application, which is provided by the payment processing service, or which can be an otherwise dedicated application. The merchant user interface 114 can enable a merchant (e.g., the merchant A 104, the merchant B 106) to process payments for POS transactions, manage inventory, manage payroll, manage restaurant services, facilitate financing services (e.g., loan services), etc. In at least one example, actions attributed to a merchant can be performed by merchant computing device(s) operable by the merchant.

In at least one example, buyers (e.g., the buyer 102) can interact with buyer computing devices (e.g., the buyer computing device 116) via respective instances of a buyer user interface (e.g., the buyer user interface 118). The buyer user interface 118 can be presented via a web browser, or the like, via a display of the buyer computing device 116. In at least one example, the buyer user interface 118 can be presented via an application, such as a mobile application or desktop application, which is provided by the payment processing service, or which can be an otherwise dedicated application. The buyer user interface 118 can enable the buyer to interact with the payment processing service, for instance to request financing, manage payments, participate in peer-to-peer payments, place delivery orders, receive courier instructions, etc. In an additional or alternative example, the buyer user interface 118 can be associated, at least in part, with the merchant computing device(s) 112 and the operations performed via the buyer user interface 118 can be performed via a buyer-facing display associated with the merchant computing device(s) 112.

In some examples, the buyer 102 can desire to purchase item(s) from the merchant A 104 using a loan. In such examples, the buyer 102 can send a request for a loan to the server computing device(s) 108. In at least one example, the request can be sent from the buyer user interface 118 (e.g., based on an interaction between the buyer user interface 118 and the buyer 102). The request can indicate particular item(s) (offered for sale by the merchant A 104) for which the buyer 102 is requesting the loan, an amount of which the buyer is requesting to borrow, a merchant for which the buyer 102 is requesting the loan (e.g., a merchant where the buyer 102 intends to use the loan), a combination of the forgoing, etc. As will be described with more detail below, in some examples, the buyer 102 can submit a request for a loan prior to interacting with a merchant (e.g., prior to entering a physical location of a merchant, etc.), during an interaction with a merchant (e.g., while at a physical location of a merchant, during a checkout flow of a transaction (e.g., online or offline), etc.), or after interacting with a merchant (e.g., after a transaction has been processed, etc.).

In at least one example, a lending module 120 associated with the server computing device(s) 108 can receive the request and can determine whether the buyer 102 is qualified for a loan and/or terms of the loan. For instance, the lending module 120 can analyze the request in view of the accounts 110 (e.g., of the buyer 102 and/or the relevant merchant, buyers similar to the buyer, etc.) and one or more other lending risk signals (e.g., indicative of creditworthiness) to determine whether the buyer 102 qualifies for the loan and/or the terms of the loan. For the purpose of this discussion, "terms of a loan" can include, but are not limited to, an amount of the loan, an interest rate associated with repayment of the loan, a repayment period associated with the loan, a frequency of repayment of the loan, an amount of an installment for repaying the loan, etc. In at least one example, the lending module 120 can utilize machine-trained data models (e.g., data models trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc.), statistics, or other processes for determining whether the buyer 102 is qualified for the loan and/or terms of the loan. That is, in some examples, the lending module 120 can determine custom terms for a particular buyer (e.g., buyer 102) based at least in part on buyer purchase behavior (e.g., of the buyer and/or of other, similar buyers) and/or merchant POS information (e.g., of a particular merchant and/or of other similar merchants). In some examples, the lending module 120 can utilize past financing activity of the buyer (e.g., buyer 102) and/or similar buyers for determining whether the buyer 102 is qualified for the loan and/or terms of the loan.

As illustrated, the buyer 102 is qualified for a first loan 122. The first loan 122 can be associated with an amount based at least in part on a cost of the item(s). In at least one example, the first loan 122 can only be used for purchasing item(s) from the merchant A 104. That is, in at least one example, the first loan 122 can be a purchase finance loan (e.g., a loan to finance a purchase of item(s) from a particular merchant). Based at least in part on determining that the buyer 102 is qualified for the loan, and the terms of the loan, the lending module 120 can notify the buyer 102. In at least one example, a buyer 102 can be notified that they are qualified for a loan prior to arriving at a physical location of a merchant or prior to the buyer 102 settling an online transaction. For instance, in such an example, an offer can be made to the buyer 102 in anticipation of the buyer 102 interacting with a merchant, responsive to determining an intent of the buyer 102 to purchase an item, responsive to the buyer 102 adding an item to a virtual cart, responsive to the buyer 102 viewing an item, etc. In at least one example, the lending module 120 can notify the buyer 102 via a notification presented via the buyer user interface 118 (e.g., an in-app notification, a user interface element presented via a GUI, etc.), an email, a text message, a push notification, etc. In some examples, such a notification can be an offer for a loan (e.g., and associated terms of the loan) which the buyer 102 can accept and, responsive to the buyer 102 accepting the offer (or the offer expiring), the lending module 120 can generate the first loan 122, i.e., associate the first loan 122 between the merchant A 104 and buyer 102 in a database or other data structure. In additional or alternative examples, such a notification can alert the buyer 102 that the buyer 102 is qualified for a loan and the terms of the loan, but the lending module 120 can refrain from generating the first loan 122 until a purchase is made by the buyer 102 (or until the qualification expires). In such examples, when the buyer 102 purchases the item(s) from the merchant A 104, the first loan 122 can be generated for an amount of the purchase price of the item(s). For the purpose of discussion, a loan can be "generated" when the funds are disbursed (e.g., to the buyer 102 or the merchant on the buyer's 102 behalf) and an association is made between the buyer, the merchant, and the loan (e.g., in a database or other data structure). After a loan is generated, the loan enters loan servicing and/or repayment wherein the buyer 102 repays the total amount of the loan, plus agreed-to interest and/or financing fee(s), over time. In at least one example, the payment processing service distributes the funds and thus the buyer 102 repays the payment processing service over time. An indication of the first loan 122 can be stored in association with an account of the buyer 102 in the accounts 110.

Similarly, the buyer 102 can request a loan for purchasing item(s) from the merchant B 106. The lending module 120 can determine that the buyer 102 is qualified for a second loan 124. In at least one example, the second loan 124 can only be used for purchasing item(s) from the merchant B 106. That is, in at least one example, the second loan 124 can be a purchase finance loan (e.g., a loan to finance a purchase of item(s) from a particular merchant). Based at least in part on determining that the buyer 102 is qualified for the loan, and the terms of the loan (which may be different from the terms of the first loan 122), the lending module 120 can notify the buyer 102. For instance, the lending module 120 can notify the buyer 102 via a notification presented via the buyer user interface 118 (e.g., an in-app notification, a user interface element presented via a GUI, etc.), an email, a text message, a push notification, etc. In some examples, such a notification can be an offer for a loan (e.g., and associated terms of the loan) which the buyer 102 can accept and, responsive to the buyer 102 accepting the offer, the lending module 120 can generate the second loan 124, i.e., associate the second loan 124 between the merchant B 106 and buyer 102 in a database or other data structure. In additional or alternative examples, such a notification can alert the buyer 102 that the buyer 102 is qualified for a loan and the terms of the loan, but the lending module 120 can refrain from generating the second loan 124 until a purchase is made by the buyer 102. In such examples, when the buyer 102 purchases the item(s) from the merchant B 106, the second loan 124 can be generated for an amount of the purchase price of the item(s). An indication of the second loan 124 can be stored in association with an account of the buyer 102 in the accounts 110.

In at least one example, the buyer 102 can track their loans via the buyer user interface 118. For instance, the buyer user interface 118 can present a graphical user interface (GUI) 126 (e.g., via a display of the buyer computing device 116), which presents, among other things, information associated with account activity of the account of the buyer 102. In some examples, the buyer user interface 118 can receive instructions for presenting the GUI 126 from the server computing device(s) 108 and the buyer user interface 118 can execute the instructions to present the GUI 126. In other examples, the buyer user interface 118 can generate the instructions for presenting the GUI 126 based at least in part on information received from the server computing device(s) 108. As will be discussed with additional detail below with reference to FIGS. 2-6, the buyer 102 can request new loans via the GUI 126 and/or manage repayment of such loans (or other types of financing) via the GUI 126.

As an example, the buyer 102 can manage repayment of at least the first loan 122 and the second loan 124 via the buyer user interface 118. For instance, the GUI 126 can include user interface elements that represent the first loan 122 and the second loan 124. Additionally, the GUI 126 can include user interface elements that represent details associated with the loans, indications of repayment associated with the loans, etc. Additional details of the GUI 126, and other GUIs, are described below with reference to FIGS. 2-6. The buyer 102 can interact with the GUI 126 to manage repayment of at least the first loan 122 and the second loan 124. For example, in at least one example, the buyer 102 can provide an input indicating that the buyer 102 desires to bundle repayment of the first loan 122 and the second loan 124 such that at least a portion of the first loan 122 and at least a portion of the second loan 124 are repaid from an account of the buyer 102. Accordingly, the server computing device(s) 108 can determine to bundle repayment of the first loan 122 and the second loan 124. In some examples, the server computing device(s) 108 can determine to bundle repayment of the first loan 122 and the second loan 124 without receiving an instruction to do so from the buyer 102. In at least one example, that account of the buyer 102 can be associated with a stored balance, which can be associated with a cash value, from which the amount of the bundled repayment can be withdrawn. In an additional or alternative example, the account can be associated with another payment mechanism (e.g., a bank account, a line of credit, another loan, etc.) which can be used to pay the amount of the bundled repayment. Furthermore, any other form of payment, including but not limited to a debit card payment, a check payment, a money order payment, a cash payment, or the like can be used to repay the loan(s). In at least one example, the payment mechanism can be selected from among a variety of available payment mechanism, for example the based on benefits associated with using the payment mechanism.

As a non-limiting example, the GUI 126 shows a bundled payment of ($402.54) which was used to repay a portion of the first loan 122 ($350.10) and a portion of the second loan 124 ($52.44). In at least one example, such a payment may have been made via stored funds and thus, the balance of the stored funds may have been reduced to $500.10 (i.e., the previous balance of the stored funds was $902.64). In such an example, the lending module 120 can perform accounting transactions to effectuate the repayment. For instance, the lending module 120 can subtract the total amount of the bundled payment from the stored balance and can add the portion of the bundled payment for repaying the first loan 122 to the remaining (repayment) balance of the first loan 122 and the portion of the bundled payment for repaying the second loan 124 to the remaining (repayment) balance of the second loan 124. The buyer user interface 118 can receive indications of payment(s) and/or other activities associated with the account and can update the GUI 126 based on such indications.

As described above, multiple loans, such as the first loan 122 and the second loan 124, can be bundled based on one or more aspects. For instance, in an example multiple loans can be bundled based on being associated with a specific payment instrument, a buyer account, a repayment schedule and/or time, repayment terms, and the like. In some examples, such aspects can be provided by the buyer 102 or intelligently and/or automatically determined by the payment processing service (e.g., the server computing device(s) 108). As a result, if the buyer 102 has a plurality of loans, a subset of those loans (e.g., the first loan 122 and the second loan 124) that are associated with a same one or more aspects can be bundled together for repayment.

While FIG. 1 is described with reference to "loans," and more specifically, purchase finance loans; as described above, techniques described herein can be applicable to other types of financing and/or debt (e.g., cash advances, credit, bills, etc.). Furthermore, in examples where techniques described herein are directed to bundling payment of multiple types of debt (e.g., loans, lines of credit, bills, etc.), "payment" may be used instead of "repayment." That is, "payment" or "repayment" can be used interchangeably throughout this disclosure to refer to remitting funds to satisfy at least a portion of a debt.

FIGS. 2-6 illustrate various example GUIs that can, among other things, facilitate requesting, managing, and/or repaying loans (or other types of debt). While the GUIs described below with reference to FIGS. 2-6 are described in the context of being presented via a buyer user interface 118, in additional or alternative examples, such GUIs can be presented via a merchant user interface 114 and/or merchant computing device(s) 112 (or any other type of device), and can be subject to interaction by merchants, buyers, or any other users.

Figure 2:
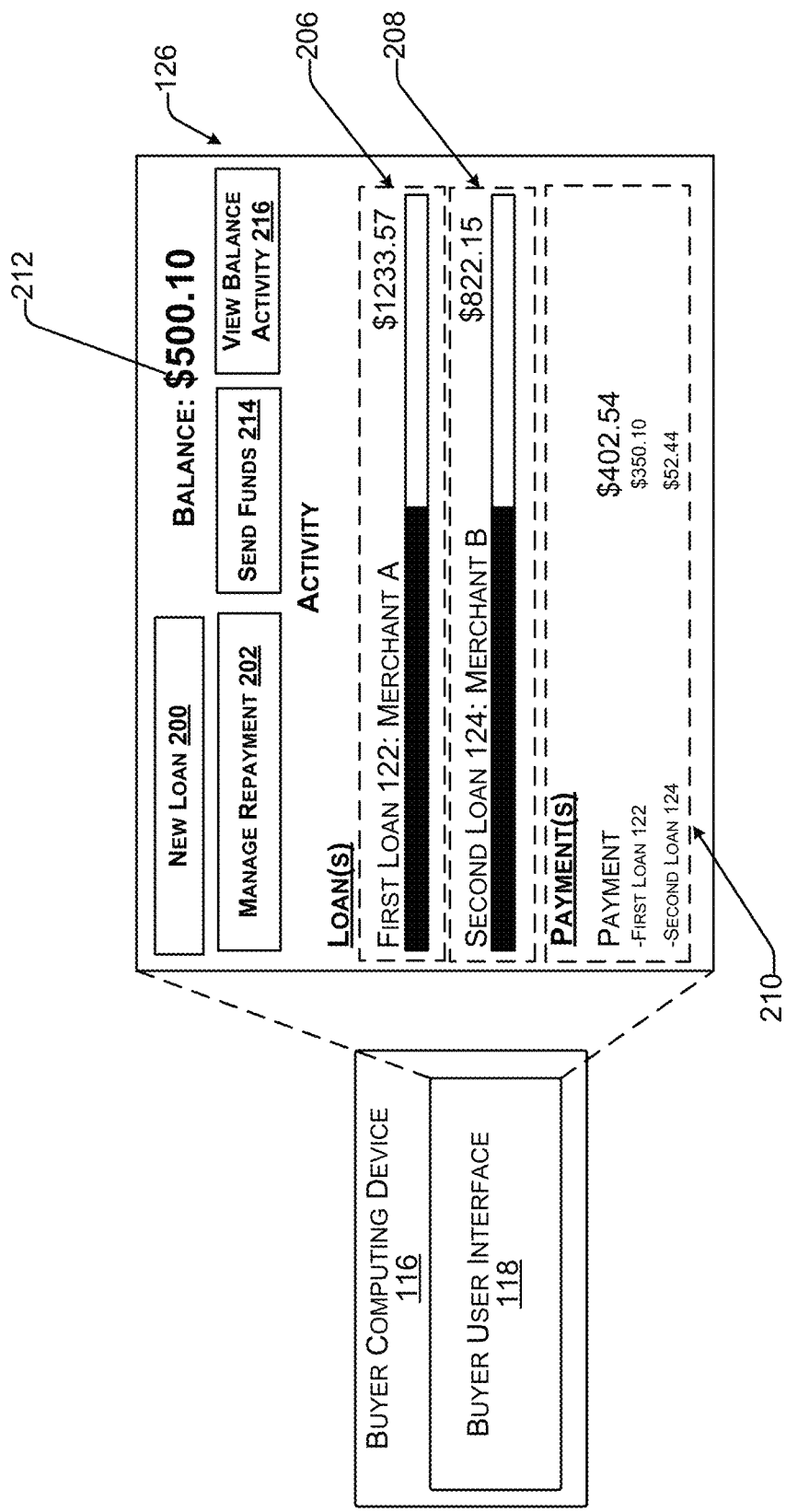
FIG. 2 illustrates a graphical user interface (GUI) for, among other things, requesting, managing, and/or repaying loans (or other types of debt).

FIG. 2 illustrates the GUI 126, as described above with reference to FIG. 1. In at least one example, the GUI 126 can comprise a landing page associated with an account of the buyer 102 and/or a summary page associated with the account accessible via another page. As illustrated, GUI 126 includes a selectable control 200 for requesting a new loan and a selectable control 202 for managing repayment. A buyer (e.g., buyer 102) can actuate one of the selectable controls to initiate a new loan request or to open a new GUI for managing repayment, for instance, via a touch on a touchscreen, a click with a mouse, a spoken input, or the like.

The GUI 126 can additionally include one or more user interface elements, which can be graphical elements, text elements, or the like. For instance, first user interface element(s) 206 can represent the first loan 122 and second user interface element(s) 208 can represent the second loan 124. In at least one example, at least some of the user interface elements represent details associated with the loans, indications of repayment associated with the loans, etc. In at least one example, the user interface elements can represent a summary of each loan for quick reference. In some examples, if the buyer 102 has multiple loans and not all of the loans can be presented via the GUI 126, the most recent loans, the largest loans, the loans with the most recent activity, and the like can be presented via the GUI 126 and the buyer 102 can interact with the GUI 126 to request to view information associated with additional or alternative loans.

In some examples, the GUI 126 can include additional or alternative user interface elements 210 associated with payments made from the account of the buyer 102. In some examples, if the buyer 102 has made multiple payments and not all of the payments can be presented via the GUI 126, the most recent payments, the largest payments, portions of payments (e.g., fractional/partial payments), etc. can be presented via the GUI 126 and the buyer 102 can interact with the GUI 126 to request to view information associated with additional or alternative payments. Moreover, in an example where the account of the buyer 102 is associated with a stored balance (e.g., $500.92), a user interface element 212 can represent the stored balance. In some examples, if the account of the buyer 102 is associated with an authorized but unused loan (e.g., a credit), a user interface element (not illustrated) can be presented with such information as well.

In at least one example, as described above, the buyer 102 can interact with the selectable control 200 to request a new loan. In such an example, the actuation of the selectable control 200 can cause a request to be sent to the server computing device(s) 108 and, responsive to receiving the request, the server computing device(s) 108 can cause additional or alternative GUIs (or, in some examples, overlays, pop-ups, or the like to be presented over GUI 126) to be presented to the buyer 102 to enable the buyer 102 to input information for obtaining a loan. That is, such additional or alternative GUIs (or, in some examples, overlays, pop-ups, or the like to be presented over GUI 126) can be presented as part of a loan application process. In at least one example, the server computing device(s) 108, via the lending module 120, can prompt the buyer 102 for information to determine whether the buyer 102 is qualified for the loan and/or buyer-specific terms. For instance, the buyer user interface 118 can present one or more GUIs to prompt the buyer 102 to provide personal information including, but not limited to, birthday, monthly housing costs, annual salary, Social Security Number, etc.

In an example where the buyer 102 is associated with an account prior to requesting a new loan, the lending module 120 can perform a look-up, or other search, to access buyer-specific data associated with the buyer 102. In some examples, the lending module 120 can modify a generic application process based on information known about the buyer 102 (from information stored in the account of the buyer 102) such that a returning buyer 102 need not provide as much information as a buyer who is applying for a loan for the first time and/or who does not have an account with the payment processing service. For instance, in at least one example, if a buyer has already applied for a loan and/or has an account with the payment processing service, the lending module 120 can prompt the buyer 102 for information about a desired purchase (e.g., amount, etc.) and can cause one or more plans to be presented to the buyer 102, without requiring the buyer 102 to input personal information.

In at least one example, the lending module 120 can prompt the buyer 102 for information associated with a particular purchase. For instance, the lending module 120 can request the buyer 102 provide information including, but not limited to, particular item(s) for which the buyer 102 is requesting the loan, an amount of which the buyer is requesting to borrow, a merchant for which the buyer 102 is requesting the loan (e.g., a merchant where the buyer 102 intends to use the loan), a combination of the forgoing, etc. In some examples, at least some of the information described above can be determined based on an interaction between the buyer 102 and a GUI associated with search results, as described below with reference to FIG. 3.

Responsive to receiving such information, the lending module 120 can analyze the request in view of the information receive, the accounts 110 (e.g., of the buyer 102 and/or the relevant merchant, buyers similar to the buyer, etc.) and one or more other lending risk signals (e.g., indicative of creditworthiness) to determine whether the buyer 102 qualifies for the loan and/or the terms of the loan. In at least one example, the lending module 120 can utilize machine-trained data models (e.g., data models trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc.), statistics, or other processes for determining whether the buyer 102 is qualified for the loan and/or terms of the loan. That is, in some examples, the lending module 120 can determine custom terms for a particular buyer (e.g., buyer 102) based at least in part on buyer purchase behavior (e.g., of the buyer and/or of other similar buyers) and/or merchant POS information (e.g., of a particular merchant and/or of other similar merchants). In some examples, the lending module 120 can utilize past financing activity of the buyer (e.g., buyer 102) and/or similar buyers for determining whether the buyer 102 is qualified for the loan and/or terms of the loan.

In at least one example, the lending module 120 can cause multiple plans (e.g., loans and associated terms) to be presented to the buyer 102 (e.g., via the buyer user interface 118) and the buyer 102 can select one of the plans. Additional details associated with customizing financing based on transaction information is described in U.S. patent application Ser. No. 15/814,366, filed on Nov. 15, 2017, the entire contents of which are incorporated by reference herein.

In at least one example, the GUI 126 can be associated with a peer-to-peer payment application such that the buyer 102 can send and/or receive funds from other users via the peer-to-peer payment application. To facilitate such transfers, the GUI 126 can include a GUI element 214 to enable the buyer 102 to send funds to other users. Further, the GUI 126 can include a GUI element 216 to enable the buyer 102 to view balance activity, which can include indications of funds received, funds sent, transactions involving the balance, loyalty information, etc.

Figure 3:
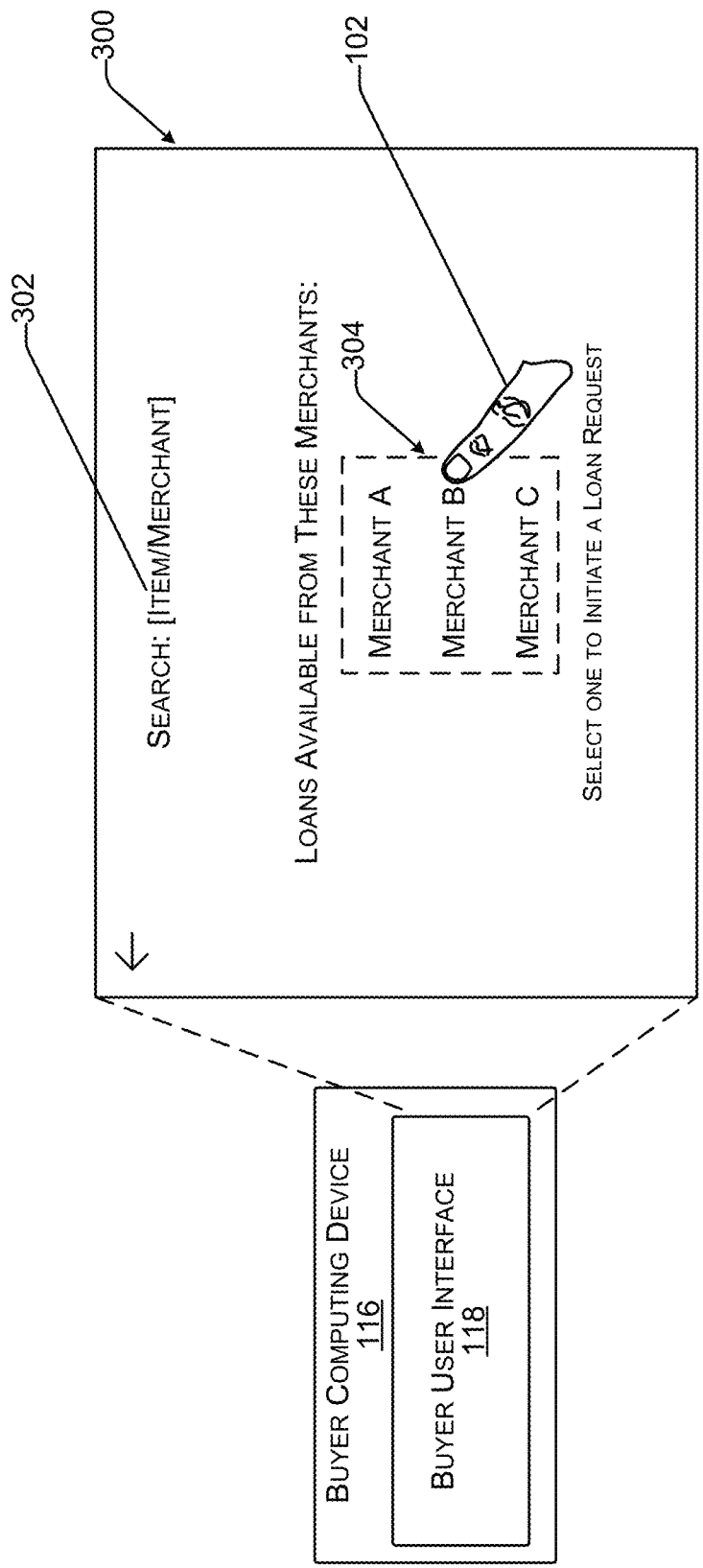
FIG. 3 illustrates a GUI from which a buyer can identify a merchant for which to request a loan.

In some examples, a buyer 102 may not be certain of the merchant for which they want to request a loan. In such examples, the buyer 102 can search for merchants and/or items (or item classifications, merchant category codes (MCCs), etc.) via a GUI, such as the GUI 300 illustrated in FIG. 3. That is, FIG. 3 illustrates a GUI 300 from which the buyer 102 can identify a merchant for which to request a loan. In some examples, the GUI 300 is presented as part of an application process (e.g., responsive to the buyer 102 actuating the selectable control 200). In additional or alternative examples, the GUI 300 is presented responsive to the buyer 102 requesting the GUI 300 (e.g., via another selectable control corresponding to a "search" function or the like).

In at least one example, the GUI 300 can include a user interface element 302 which prompts the buyer 102 to input an item, a category of items, a merchant, an MCC, a location, etc. Such an input can be a text input, a spoken input, an image, etc. Responsive to receiving an input, the buyer user interface 118 can submit a query to the server computing device(s) 108. The lending module 120 can receive the query, intelligently discover relevant results, and generate the results. For example, if the input is an item, the lending module 120 can perform a lookup, or other search, of the accounts 110 to identify merchants that (i) offer loans via the payment processing service and (ii) offer the item for sale, or even similar merchants that offer the same item or similar items. The lending module 120 can generate a list of one or more merchants that both (i) offer loans via the payment processing service and (ii) offer the item for sale. In some examples, the returned list can be associated with annual percentage rates (APRs) and/or other terms such that the buyer 102 can perform comparison shopping (e.g., for loans) across relevant merchants.

In some examples, the lending module 120 can utilize data stored in association with the accounts 110 to select a subset of the one or more merchants that are most relevant to the buyer 102 to return to the buyer 102 responsive to the query. That is, in at least one example, the lending module 120 can utilize a buyer characteristic (e.g., of the buyer 102 and/or similar buyers) to determine a subset of merchants that are relevant to a buyer 102. In at least one example, the lending module 120 can identify a subset of merchants that are in a particular geolocation of the buyer 102 or are within a threshold distance of the particular geolocation (determined based on a geolocation provided by the buyer 102 (e.g., shipping address, billing address, etc.) and/or as observed from previous transaction data associated with previous transactions of the buyer with merchants of the payment processing service), a subset of merchants that are within a particular price range (determined based on buyer spending patterns as determined from transaction data associated with previous transactions of the buyer with merchants of the payment processing service), have a particular rating (determined based on buyer patterns as determined from transaction data associated with previous transactions of the buyer with merchants of the payment processing service), etc. In some examples, the lending module 120 can rank merchants based on buyer characteristics and/or merchant characteristics, such that the most relevant merchants are presented to the buyer 102 prior to less relevant merchants being presented to the buyer 102. In some cases, the buyer may set preferences of APR rates, merchant locations, merchant, payment mechanisms, payment terms, etc., which may be used to determine relevance. The ranking can be used to aid selection of a loan offer from among several offers.

In at least one example, the lending module 120 can utilize machine-trained data models (e.g., data models trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc.), statistics, or other processes for identifying relevant merchants and/or ranking merchants based on relevance. For example, a machine-learning mechanism can analyze training data (e.g., buyer data, POS transaction data, merchant data, etc.) to train a data model that outputs a score, or other indication, indicating a relevance of a merchant to a buyer. Such scores, or other indications, can be used to identify relevant merchants and/or subsets of relevant merchants (e.g., based on whether individual scores meet or exceed a threshold, etc.).

Additionally or alternatively, the buyer 102 can search for a particular merchant. That is, the input associated with the user interface element 302 can be a merchant (instead of an item, as described above). In such an example, responsive to receiving an input, the buyer user interface 118 can submit a query to the server computing device(s) 108. The lending module 120 can receive the query and generate a result. For example, the lending module 120 can perform a lookup, or other search, of the accounts 110 to determine whether the inputted merchant (i) is associated with an account and (ii) offers loans via the payment processing service. If the merchant (i) is associated with an account and (ii) offers loans via the payment processing service, the lending module 120 can generate a result. In some examples, whether the merchant (i) is associated with an account and (ii) offers loans via the payment processing service, or not, the lending module 120 can generate a list of one or more additional merchants that are similar to the merchant, and (i) are associated with an account and (ii) offers loans via the payment processing service. A merchant may be similar to another merchant based on having a same (or related) MCC, selling the same (or similar) items, being in a same (or proximate) geolocation, etc. In at least one example, the lending module 120 can utilize machine-trained data models (e.g., data models trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc.), statistics, or other processes to determine similar merchants. For example, a machine-learning mechanism can analyze training data (e.g., POS transaction data, merchant data, etc.) to train a data model that outputs a score, or other indication, indicating a similarity between merchants. Such scores, or other indications, can be used to identify similar merchants and/or subsets of similar merchants (e.g., based on whether individual scores meet or exceed a threshold, etc.).

As described above, in some example, the lending module 120 can utilize characteristic(s) of the buyer 102 to determine which merchant(s) to recommend to the buyer 102 and/or an order for recommending such merchants to the buyer 102.

The lending module 120 can generate a result and send the result back to the buyer user interface 118. The buyer user interface 118 can update the GUI 300 to include user interface element(s) 304 that represent the merchant(s) identified by the lending module 120. In some examples, each of the user interface element(s) 304 can be associated with a selectable control, the actuation of which can comprise an input (or selection). The buyer 102 can interact with the GUI 300 to select a merchant and the buyer user interface 118 can send an indication of the selection to the lending module 120. The lending module 120 can then use such information in determining whether the buyer 102 is qualified for a loan and/or the terms of the loan.

In at least one example, if the buyer 102 did not access the GUI 300 via a landing page of an account (e.g., GUI 126), selection of a merchant from the list of merchants presented can initiate a loan request. Then, similar to as described above, the buyer user interface 118 can communicate with the lending module 120 to facilitate a loan application.

In some examples, the buyer user interface 118 and/or the lending module 120 can present one or more merchants via a GUI similar to GUI 300 without having received a search query first. For instance, in at least one example, the buyer user interface 118 and/or the lending module 120 can present such a GUI via the buyer computing device 116 based on an observed characteristic of the buyer 102. For example, if the buyer 102 is proximate a merchant that offers loans for an item that the buyer 102 has previously purchased, viewed (e.g., online), etc. and/or an item that is related to an item that the buyer 102 has previously purchased, viewed (e.g., online), etc., the buyer user interface 118 and/or the lending module 120 can notify the buyer 102 of such information and prompt the buyer 102 to apply for a loan.

Figure 4:
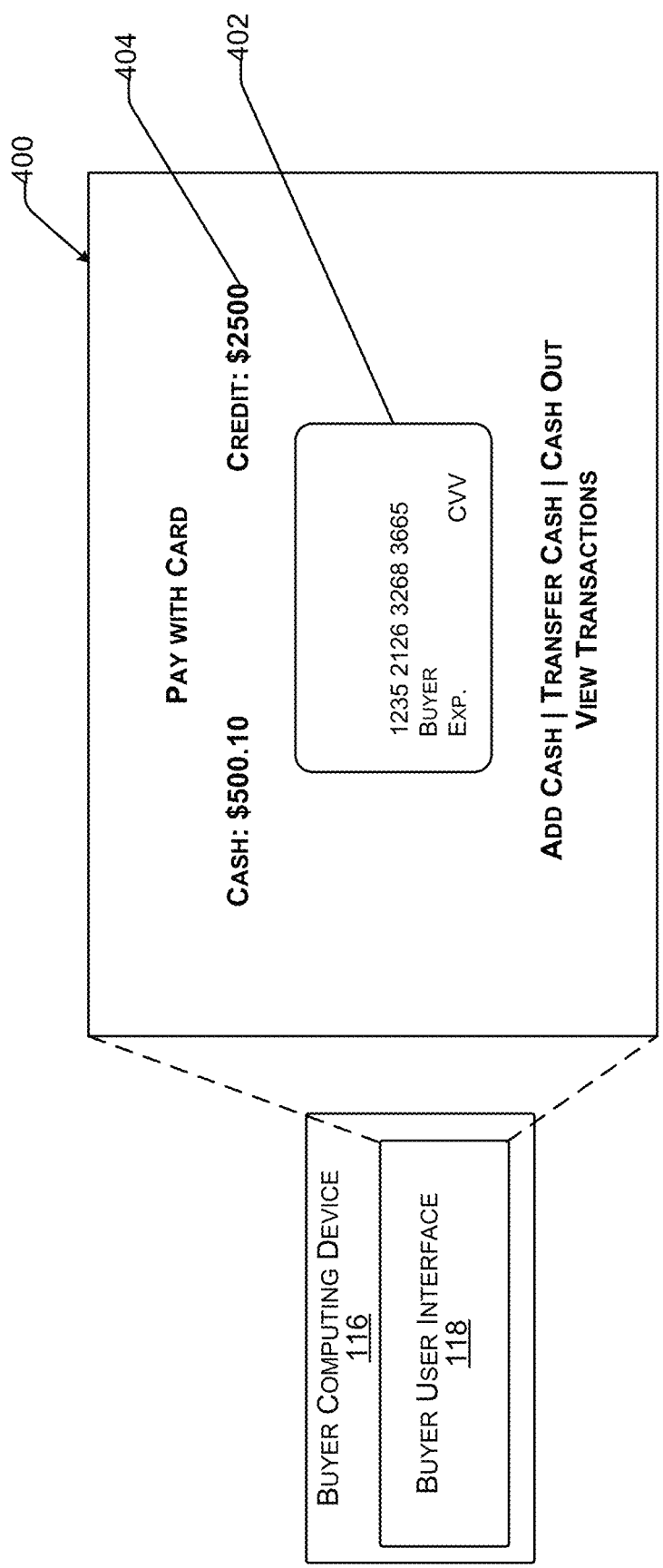
FIG. 4 illustrates an example GUI that enables a buyer to use a payment instrument associated with an account of the buyer to apply a loan to a transaction.

FIG. 4 illustrates an example GUI 400 that enables the buyer 102 to use a payment instrument associated with the account of the buyer 102 to apply a loan to a purchase.

In some examples, the account of the buyer 102 can be associated with a payment instrument 402. The payment instrument 402 can be at least one of a physical payment instrument (e.g., a card with a magnetic strip, a chip, or other embedded technology), a digital payment instrument, etc. that is associated with payment data (e.g., a name of the buyer, an address of the buyer, a type (e.g., credit, debit, etc.) of a payment instrument from which the payment data is accessed, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration date associated with the payment instrument, a primary account number (PAN) corresponding to the buyer (which may or may not match the number associated with the payment instrument), restrictions on what types of charges/debts may be made, etc.). In at least one example, the payment instrument 402 can be associated with a balance that is equal to the stored balance of the account. That is, if the stored balance is $500.10, the payment instrument 402 can have a balance equal to $550.10. The buyer 102 can use the payment instrument 402 for interacting with merchants and, when the buyer 102 makes a purchase using the payment instrument 402, the amount of the purchase can be withdrawn from the stored balance. Furthermore, if the buyer 102 receives funds (e.g., via a peer-to-peer payment), the amount of funds received can be added to the stored balance and thus the balance of the payment instrument 402 can increase.

In at least one example, when the buyer 102 is approved for a loan, the amount of the loan can be associated with the payment instrument 402. In such an example, the amount of the loan (for which the buyer 102 has been approved) can be presented via the GUI 400 (e.g., via a user interface element 404). In at least one example, when the buyer 102 uses the payment instrument 402 to pay for an item at the merchant to whom the loan corresponds, the lending module 120 can cause a notification to be presented to the buyer 102 that notifies the buyer 102 that they have a pending (preapproved) loan (e.g., credit) available. Such a notification can be presented via the GUI 400 and/or via merchant computing device(s) (e.g., merchant computing device(s) 112). In such an example, the buyer 102 can opt to apply the loan to the transaction or a portion of the transaction (e.g., an individual item, etc.). In some examples, if the total cost of the transaction is greater than the amount of the credit, the buyer 102 can apply the entire loan to the transaction and the lending module 120 can generate a loan for the entire amount of the credit. Or, if the buyer 102 opts to apply the loan to a portion of the transaction (e.g., an individual item, etc.), which is less than the amount for which the buyer 102 was approved (e.g., the amount of the credit), and/or the total cost of the transaction is less than the entire amount for which the buyer 102 was approved, the lending module 120 can generate a loan for the lesser amount.

In some examples, the GUI 400 can include additional or alternative user interface elements 406 to enable the buyer 102 to manage the stored balance associated with the account. For instance, the buyer 102 can interact with the GUI 400 to add cash to the stored balance (e.g., from a bank account linked to the account), transfer cash to another user, cash out (e.g., transfer the stored balance (or a portion thereof) to another account (e.g., a bank account linked to the account)), view transactions associated with the stored balance, etc.

Figure 5:
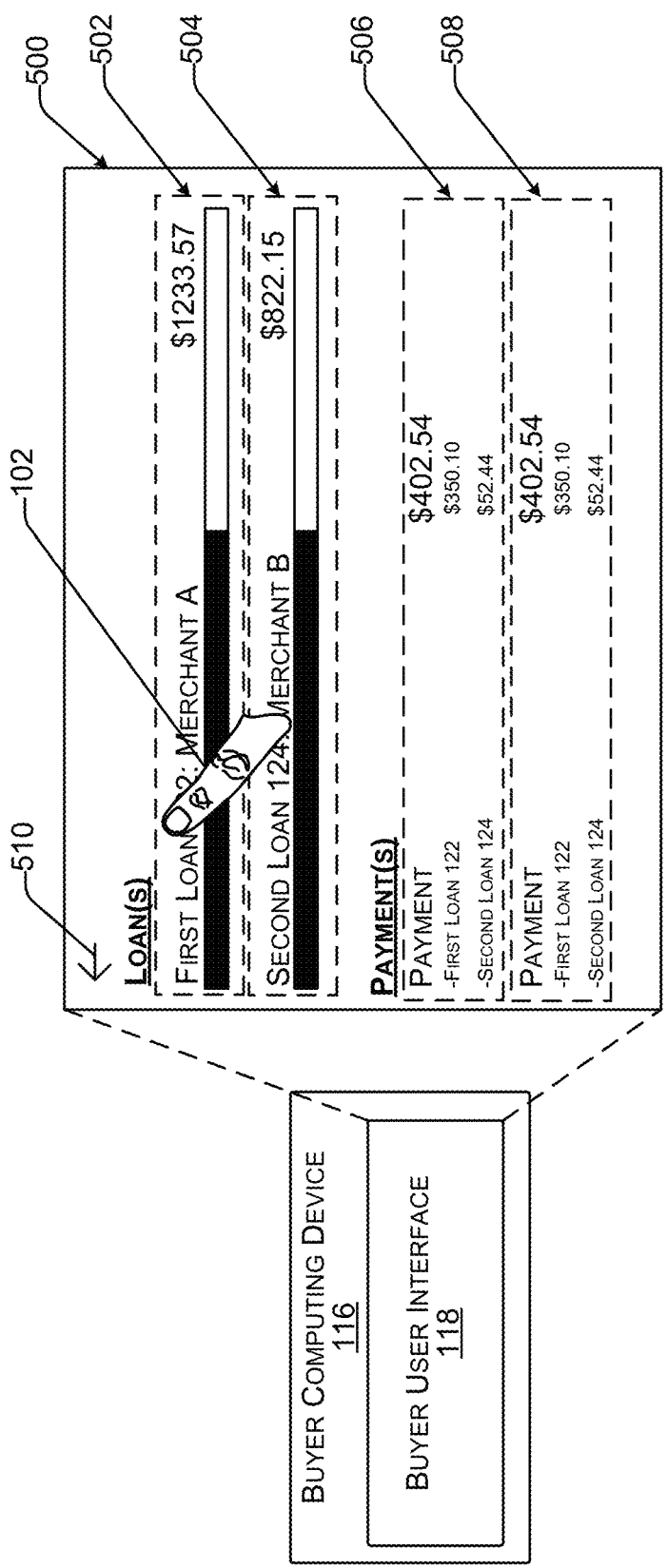
FIG. 5 illustrates an example GUI for managing payments.

FIG. 5 illustrates an example GUI 500 for managing payments. As described above with reference to FIG. 2, in at least one example, the buyer 102 can interact with the GUI 126 to actuate a selectable control 202 associated with managing repayment. Based at least in part on selection of such a selectable control 202, the buyer user interface 118 can cause the GUI 500 to be presented. The GUI 500 can present user interface elements that represent one or more activities associated with the account of the buyer 102. In some examples, the GUI 500 can include the same user interface elements as the user interface elements described above with reference to FIG. 2. For instance, the GUI 500 can additionally include one or more user interface elements, which can be graphical elements, text elements, or the like. For instance, first user interface element(s) 502 can represent the first loan 122 and second user interface element(s) 504 can represent the second loan 124. In at least one example, at least some of the user interface elements represent details associated with the loans, indications of repayment associated with the loans, etc. In at least one example, the user interface elements can represent a summary of each loan for quick reference. In some examples, if the buyer 102 has multiple loans and not all of the loans can be presented via the GUI 500, the most recent loans, the largest loans, the loans with the most recent activity, and the like can be presented via the GUI 500 and the buyer 102 can interact with the GUI 500 to request to view information associated with additional or alternative loans.

In some examples, the GUI 500 can include user interface elements 210 associated with payments made from the account of the buyer 102. For instance, third user interface element(s) 506 can represent a first payment and fourth user interface element(s) 508 can represent a second payment, which can be associated with payments made on different days, weeks, months, or the like. In some examples, if the buyer 102 has made multiple payments and not all of the payments can be presented via the GUI 500, the most recent payments, the largest payments, etc. can be presented via the GUI 500 and the buyer 102 can interact with the GUI 500 to request to view information associated with additional or alternative payments.

In at least one example, the user interface element(s) can be associated with selectable controls such that when a user interface element is selected, the buyer 102 can view additional information associated with the corresponding activity. For instance, if the buyer 102 selects the selectable control corresponding to the first user interface element(s) 502, the buyer 102 can view additional information associated with the first loan 122 via an additional GUI, such as GUI 600, which is described below with reference to FIG. 6. To return to the landing page associated with the account, the buyer 102 can select the back arrow 510 (or another user interface element with the same functionality).

Figure 6:
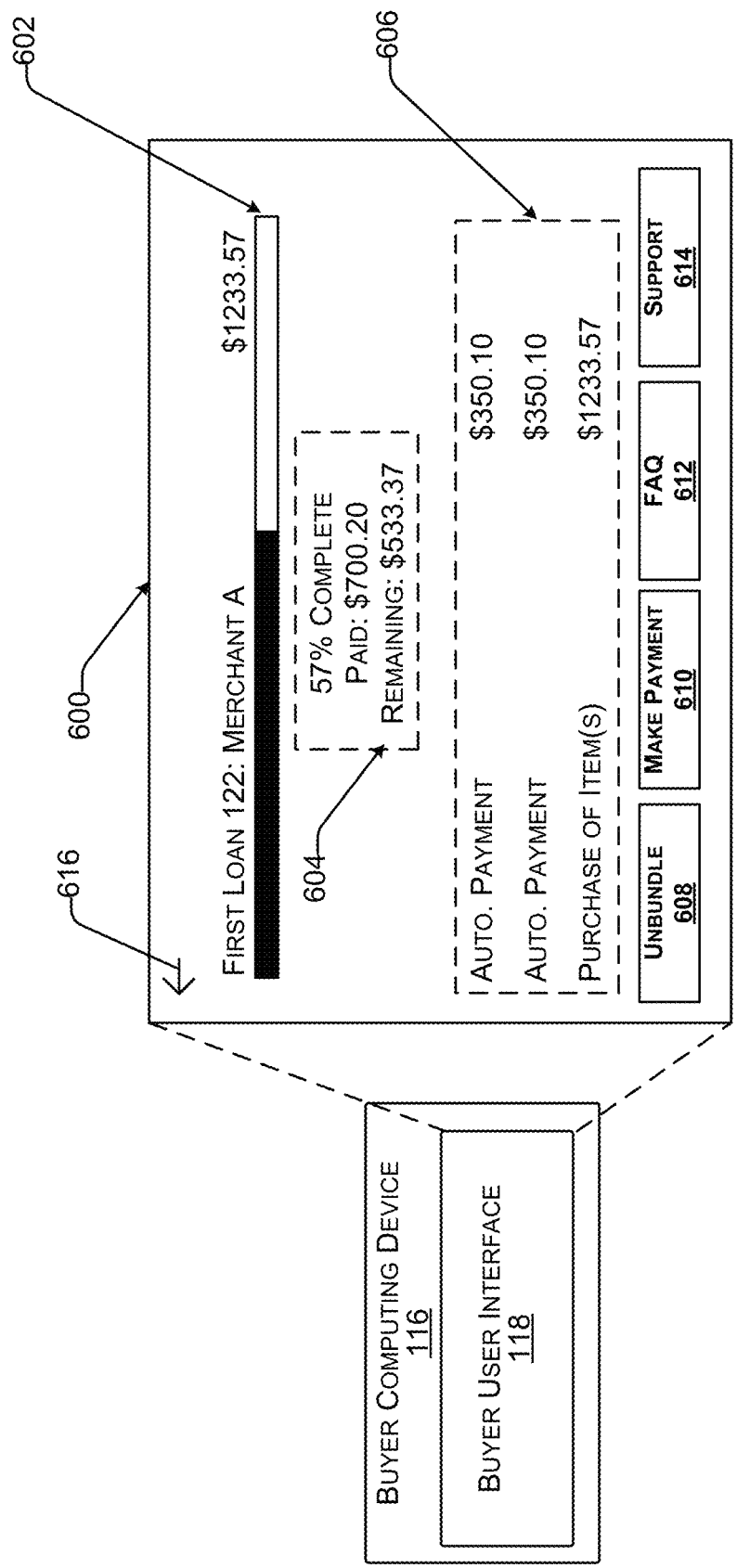
FIG. 6 illustrates an example GUI for presenting details associated with an activity, such as a loan or a payment.

FIG. 6 illustrates an example GUI 600 for presenting details associated with an activity, such as a loan or a payment. The GUI 600 includes user interface elements that are associated with details of the first loan 122. As illustrated in FIG. 6, the GUI 600 can include a user interface element 602 that provides a graphical representation of the progress made in repaying the first loan. Furthermore, the GUI 600 can include additional user interface elements 604 that provide additional information about the loan. For instance, as a non-limiting example, the user interface elements 604 represent information indicating that the buyer 102 has paid $700.20 of the $1233.57 balance. As such, the buyer 102 is 57% complete in its repayment (as illustrated by the user interface element 602) and has $533.37 remaining. In at least one example, the GUI 600 can include user interface elements 606 that represent activities of the first loan. For instance, the user interface elements 606 can show that the buyer 102 purchased item(s) from the merchant A 104 for $1233.57 and has subsequently made two automatic payments of $350.10. As illustrated on the detailed page of the account (e.g., GUI 500) and the landing page (e.g., GUI 126), the automatic payments $350.10 were made in association with a payment of the second loan 124. That is, the automatic payments $350.10 represented by the user interface elements 606 were part of bundled payments.

The GUI 600 can include one or more selectable controls 608-614, that when actuated enable the buyer 102 to perform one or more actions. For example, selectable control 608 enables the buyer 102 to unbundle repayment of the loan, selectable control 610 enables the buyer 102 to make a manual payment, selectable control 612 enables the buyer 102 to access frequently asked questions (FAQs), and selectable control 614 enables the buyer 102 to request support. To return to the landing page associated with the account, the buyer 102 can select the back arrow 616 (or another user interface element with the same functionality).

FIGS. 2-6 are non-limiting examples of GUIs that can be presented via the buyer user interface 118. In additional or alternative examples, additional or alternative information can be presented via the GUIs in similar or different configurations. As described above, the GUIs described with reference to FIGS. 2-6 can be presented via a display of a buyer computing device (e.g., the buyer computing device 116) and/or can be output via another output device (e.g., a buyer-facing display of merchant computing device(s) 112, etc.), as described below.

FIGS. 7-14 are flowcharts showing example methods involving techniques as described herein. The methods illustrated in FIGS. 7-14 are described with reference to FIGS. 1-6 and FIGS. 15-17 below, for convenience and ease of understanding. However, the methods illustrated in FIGS. 7-14 are not limited to being performed using components described in FIGS. 1-6 and FIGS. 15-17, and such components are not limited to performing the methods illustrated in FIGS. 7-14.

The methods 700-1400 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods 700-1400 can be combined in whole or in part with each other or with other methods.

Figure 7:
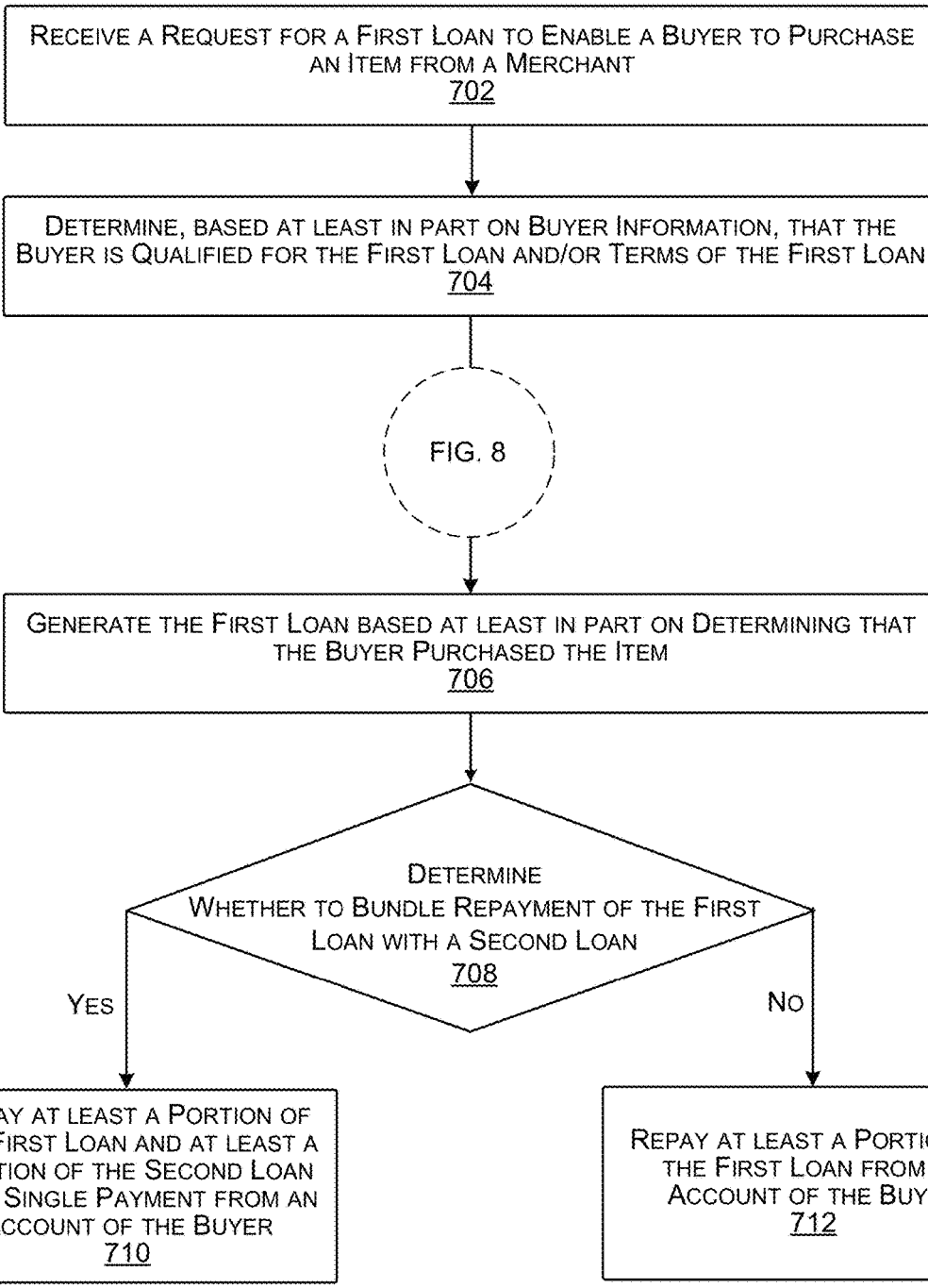
FIG. 7 illustrates an example process for determining whether to bundle payments and making payments based on said determination.

FIG. 7 illustrates an example process 700 for determining whether to bundle payments.

Block 702 illustrates receiving a request for a first loan to enable a buyer to purchase an item from a merchant. In some examples, a buyer, such as the buyer 102, can desire to purchase item(s) from a merchant using a loan. In such examples, the buyer 102 can send a request for a loan to the server computing device(s) 108. In at least one example, the request can be sent from the buyer user interface 118 (e.g., based on an interaction between the buyer user interface 118 and the buyer 102). The request can indicate particular item(s) for which the buyer 102 is requesting the loan, an amount of which the buyer is requesting to borrow, a merchant for which the buyer 102 is requesting the loan (e.g., a merchant where the buyer 102 intends to use the loan), a combination of the forgoing, etc.

In some examples, the buyer 102 can submit a request for a loan prior to interacting with a merchant, for instance, prior to entering a physical location of a merchant, etc. In such an example, the buyer 102 can interact with the buyer user interface 118 to request a loan. As described above with reference to FIGS. 2-6, in some examples, such a request can be initiated via a selection of a merchant and/or an item returned via a search result or other notification. In some examples, the buyer 102 can submit a request during an interaction with a merchant (e.g., while at a physical location of a merchant, during a checkout flow of a transaction (e.g., online or offline), etc.). For instance, in some examples, the buyer 102 can scan a barcode, quick response (QR) code, or another code associated with an item to submit a request for a loan for the item. In additional or alternative examples, the buyer 102 can submit a request for a loan after interacting with a merchant (e.g., after a transaction has been processed, etc.). In such examples, as described below, the buyer 102 can interact with a receipt or another record of the transaction to submit a request for a loan after the transaction has been processed.

Block 704 illustrates determining, based at least in part on buyer information, that the buyer is qualified for the first loan and/or terms of the first loan. In at least one example, a lending module 120 associated with the server computing device(s) 108 can receive the request and can determine whether the buyer 102 is qualified for a loan and/or terms of the loan. For instance, the lending module 120 can analyze the request in view of the accounts 110 (e.g., of the buyer 102 and/or the relevant merchant, buyers similar to the buyer, etc.) and one or more other lending risk signals (e.g., indicative of creditworthiness) to determine whether the buyer 102 qualifies for the loan and/or the terms of the loan. As described above, "terms of a loan" can include, but are not limited to, an amount of the loan, an interest rate associated with repayment of the loan, a repayment period associated with the loan, a frequency of repayment of the loan, an amount of an installment for repaying the loan, etc.

In at least one example, the lending module 120 can utilize machine-trained data models (e.g., data models trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc.), statistics, or other processes for determining whether the buyer 102 is qualified for the loan and/or terms of the loan. That is, in some examples, the lending module 120 can determine custom terms for a particular buyer (e.g., buyer 102) based at least in part on buyer purchase behavior (e.g., of the buyer and/or of other, similar buyers) and/or merchant POS information (e.g., of a particular merchant and/or of other similar merchants). In some examples, the lending module 120 can utilize past financing activity of the buyer (e.g., buyer 102) and/or similar buyers for determining whether the buyer 102 is qualified for the loan and/or terms of the loan.

In at least one example, the loan can be associated with an amount based at least in part on a cost of the item. In at least one example, the loan can only be used for purchasing the item from the merchant. That is, in at least one example, the loan can be a purchase finance loan (e.g., a loan to finance a purchase of item(s) from a particular merchant). Based at least in part on determining that the buyer 102 is qualified for the loan, and the terms of the loan, the lending module 120 can notify the buyer 102.

Block 706 illustrates generating the first loan based at least in part on determining that the buyer purchased the item. In some examples, the lending module 120 can send, to a computing device (e.g., merchant computing device(s) 112 and/or buyer computing device 116), an offer for a loan (e.g., and associated terms of the loan) which the buyer 102 can accept and, responsive to the buyer 102 accepting the offer (or the offer expiring), the lending module 120 can generate the loan. In additional or alternative examples, such a notification can alert the buyer 102 that the buyer 102 is qualified for a loan and the terms of the loan, but the lending module 120 can refrain from generating the loan until a purchase is made by the buyer 102 (or until the qualification expires). In some examples, an amount of the loan can be associated with a payment instrument of the buyer 102 until the loan is generated or the offer expires. Additional details are described below with reference to FIG. 8. In at least one example, when the buyer 102 purchases the item from the merchant, the loan can be generated for an amount of the purchase price of the item. An indication of the loan can be stored in association with an account of the buyer 102 in the accounts 110.

Block 708 illustrates determining whether to bundle repayment of the first loan with a second loan. In at least one example, the lending module 120 can determine whether to bundle repayment of the first loan with a second loan. As described above, in some examples, the second loan can be another loan issued by the loan service (of the payment processing service) to enable the buyer 102 to purchase another item from the merchant or a different merchant associated with the payment processing service. In other examples, the second loan can be another loan issued by an unrelated loan or financing service.

In at least one example, loans can be bundled based on one or more aspects, as described above. For instance, in an example multiple loans can be bundled based on being associated with a specific payment instrument, a buyer account, a repayment schedule and/or time, repayment terms, and the like. In some examples, such aspects can be provided by the buyer or intelligently and/or automatically determined by the payment processing service. As a result, if the buyer has a plurality of loans, a subset of those loans that are associated with a same one or more aspects can be bundled together for repayment.

In some examples, the buyer 102 can have multiple loans (or other types of financing), which can be managed via GUIs as described above with reference to FIGS. 2-6. In at least one example, the buyer 102 can interact with the buyer user interface 118 to indicate that the buyer 102 desires to bundle payment of the first loan with the second loan. Based on receiving such an indication via the buyer user interface 118, the lending module 120 can determine to bundle repayment of the first loan with the second loan.

In additional or alternative examples, the lending module 120 can utilize machine-trained data model(s) (e.g., data model(s) trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc.), statistics, or other processes for determining which loans to bundle for payment and, in some examples, how to allocate portions of the payment between multiple bundled loans. For example, a machine-learning mechanism can analyze training data to train a data model that outputs a recommendation of which loans to bundle for repayment and how such payment should be allocated between the loans. Additional details are described below with reference to FIG. 9.

Block 710 illustrates repaying at least a portion of the first loan and at least a portion of the second loan with a single payment from an account of the buyer. Based on determining to bundle repayment of the first loan and at least the second loan (e.g., "yes" from block 708), the lending module 120 can facilitate the repayment of at least a portion of the first loan and at least a portion of the second loan via a single payment from an account of the buyer 102, even though the loans are associated with different merchants. If the first loan and the second loan are associated with the payment processing service, the single payment can be made to the payment processing service from the account of the buyer 102. If the second loan is associated with another loan or financing service, the lending module 120 can facilitate payment of the second loan on behalf of the buyer 102.

In at least one example, at least a portion of each of the bundled loans can be repaid from the stored balance associated with the account. That is, in at least one example, the lending module 120 can repay, to the payment processing service, respective installments of the first loan and the second loan via a single repayment from the account of the buyer 102. In at least one example, the account of the buyer 102 can be associated with a buyer-facing service (e.g., a peer-to-peer payment service, a delivery service, etc.) offered by the payment processing service. In additional or alternative examples, at least a portion of each of the bundled loans can be repaid with another source of funds. In some examples, such payments can be made automatically, without requiring further input from the buyer. That is, in some examples, bundled repayments can be made automatically.

Block 712 illustrates repaying at least a portion of the first loan from an account of the buyer. Based on determining not to bundle repayment of the first loan and at least the second loan (e.g., "no" from block 708), the lending module 120 can facilitate the repayment of at least a portion of the first loan via a single payment from an account of the buyer 102.

While both blocks 710 and 712 describe repaying at least a portion of the first loan and/or the second loan via an account of the buyer 102, which can be associated with a stored balance, in an additional or alternative example, the account can be associated with another payment mechanism (e.g., a bank account, a line of credit, another loan, etc.) which can be used to pay the amount of the bundled (or unbundled) repayment. Furthermore, any other form of payment, including but not limited to a debit card payment, a check payment, a money order payment, a cash payment, or the like can be used to repay the loan(s).

Figure 8:
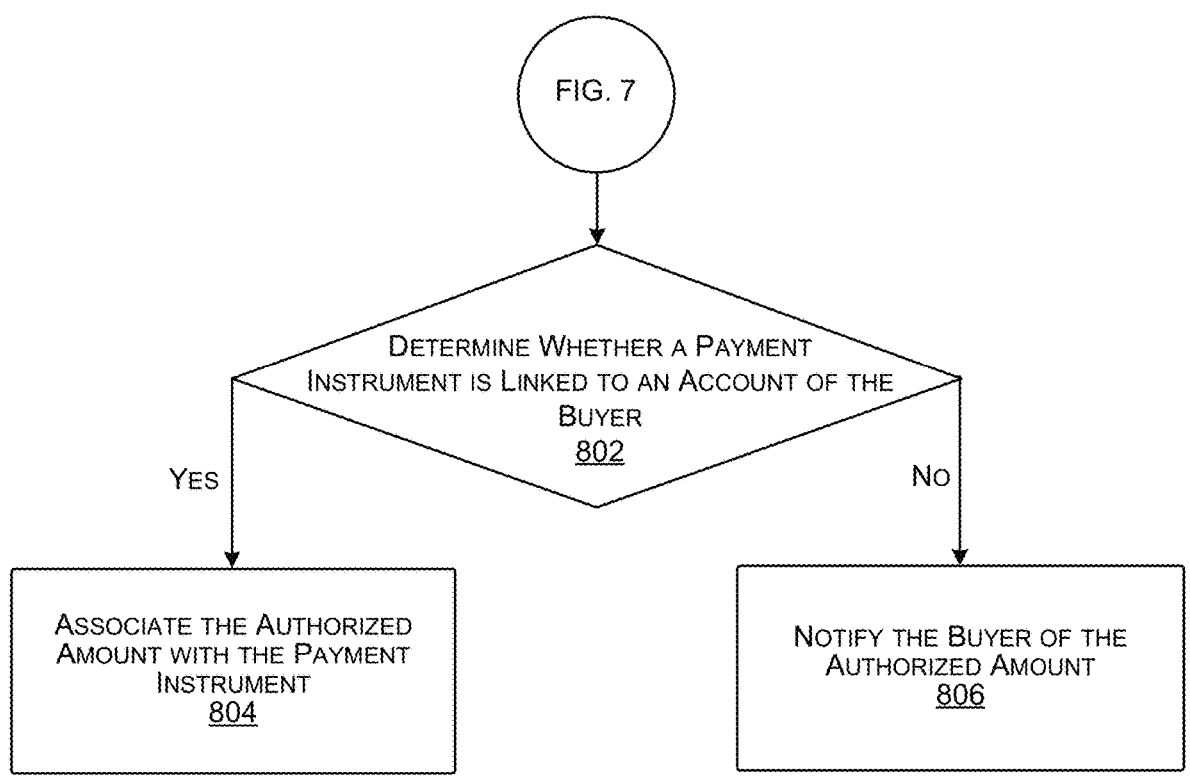
FIG. 8 illustrates an example process for associating a loan with a payment instrument of a buyer.

FIG. 8 illustrates an example process 800 for associating a loan with a payment instrument of a buyer. As described above, in some examples, the lending module 120 can associate an amount of the loan with a payment instrument of the buyer 102 such that the loan is generated upon use of the payment instrument at the merchant where the loan is intended to be used. Blocks 802-808 are directed to such examples, which can be an optional operation performed as part of the process 700 described above.

Block 802 illustrates determining whether a payment instrument is linked to an account of the buyer. As described above with reference to FIG. 4, in some examples, the account of the buyer 102 can be associated with a payment instrument. The payment instrument can be at least one of a physical payment instrument (e.g., a card with a magnetic strip, a chip, or other embedded technology), a digital payment instrument, etc. that is associated with payment data (e.g., a name of the buyer, an address of the buyer, a type (e.g., credit, debit, etc.) of a payment instrument from which the payment data is accessed, a number associated with the payment instrument, a verification value (PVKI, PVV, CVV, CVC, etc.) associated with the payment instrument, an expiration date associated with the payment instrument, a PAN corresponding to the buyer (which may or may not match the number associated with the payment instrument), restrictions on what types of charges/debts may be made, etc.)). In at least one example, the payment instrument can be associated with a balance that is equal to the stored balance of the account. The buyer 102 can use the payment instrument for interacting with merchants and, when the buyer 102 makes a purchase using the payment instrument, the amount of the purchase can be withdrawn from the stored balance. Furthermore, if the buyer 102 receives funds (e.g., via a peer-to-peer payment), the amount of funds received can be added to the stored balance and thus the balance of the payment instrument can increase. In at least one example, the lending module 120 can determine whether the buyer 102 has a payment instrument linked to their account.

Block 804 illustrates associating the authorized amount with the payment instrument. Based at least in part on determining that the account of the buyer 102 is associated with a payment instrument (e.g., "yes" from block 802), the lending module 120 can associate the authorized amount with the payment instrument. That is, in at least one example, the lending module 120 can link, or otherwise associate, a credit representing the authorized amount of the loan with the payment instrument. In at least one example, the lending module 120 can prompt the buyer 102 to approve the association (or not) via the buyer user interface 118. In some examples, the amount of the loan (for which the buyer 102 has been approved) can be presented via the GUI 400 (e.g., via a user interface element 404). The payment instrument may be picked from among several based on the benefits that the payment instrument affords, or the past use of the payment instrument. For example, if the payment instrument provides benefit when the bundled payment is less than a certain amount, etc.

In at least one example, when the buyer 102 uses the payment instrument to pay for an item at the merchant to which the loan corresponds (e.g., presumably for the item), the lending module 120 can cause a notification to be presented to the buyer 102 that notifies the buyer 102 that they have a pending (preapproved) loan available. Such a notification can be presented via the GUI 400 and/or via merchant computing device(s) (e.g., merchant computing device(s) 112). In such an example, the buyer 102 can opt to apply the loan to the transaction or a portion of the transaction (e.g., an individual item, etc.). In some examples, if the total cost of the transaction is greater than the amount of the loan, the buyer 102 can apply the entire loan to the transaction and the lending module 120 can generate a loan for the entire amount of the loan (and the buyer 102 may need to provide another source of funds for the remaining amount of the total cost of the transaction). Or, if the buyer 102 opts to apply the loan to a portion of the transaction (e.g., an individual item, etc.), which is less than the amount for which the buyer 102 was approved, and/or the total cost of the transaction is less than the entire amount for which the buyer 102 was approved, the lending module 120 can generate a loan for the lesser amount.

Block 808 illustrates notifying the buyer of the authorized amount. Based on determining that the account of the buyer 102 is not associated with the payment instrument (e.g., "no" from block 802), the lending module 120 can send, to a computing device (e.g., merchant computing device(s) 112 and/or buyer computing device 116), an offer for a loan (e.g., and associated terms of the loan) which the buyer 102 can accept and, responsive to the buyer 102 accepting the offer (or the offer expiring), the lending module 120 can generate the loan. In additional or alternative examples, such a notification can alert the buyer 102 that the buyer 102 is qualified for a loan and the terms of the loan, but the lending module 120 can refrain from generating the loan until a purchase is made by the buyer 102 (or until the qualification expires).

Figure 9:
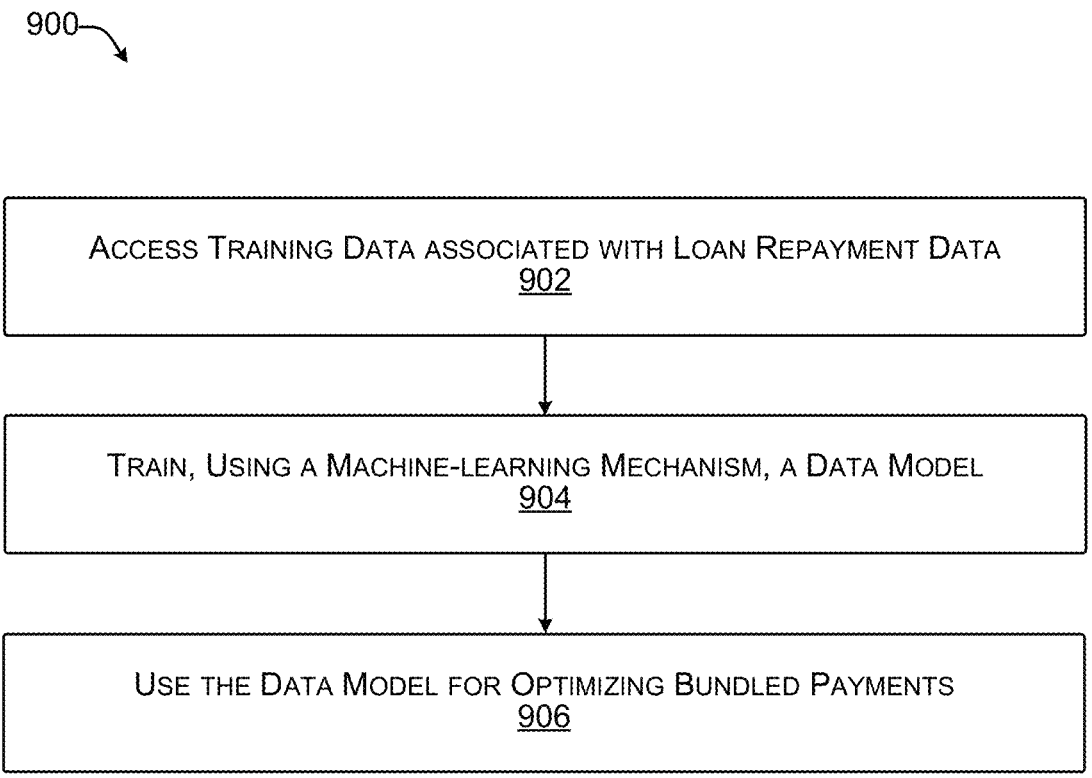
FIG. 9 illustrates an example process for training a data model, using a machine-learning mechanism, that can be used for optimizing bundled payments.

FIG. 9 illustrates an example process 900 for training a data model, using a machine-learning mechanism, that can be used for optimizing bundled payments.

Block 902 illustrates accessing training data associated with loan repayment data. In at least one example, a training module associated with the server computing device(s) 108 can access training data associated with loan repayment data. Such loan repayment data can be stored in association with the accounts 110 and/or can be stored in another data structure associated with the server computing device(s) 108. In at least one example, loan repayment data can include loans, their associated terms (e.g., interest rates, annual percentage ratings (APRs), lengths of loans, etc.), and repayment schedules and/or progression. Further, in some examples, loan repayment data can indicate bundled loans and such repayment schedules and/or progression.

Block 904 illustrates training, using a machine-learning mechanism, a data model. In at least one example, a training module associated with the server computing device(s) 108 can analyze the training data using a machine-learning mechanism. As referenced herein, machine-learning mechanisms can include supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. The resulting data model can output an indication of how to allocate a single payment for repaying one or more bundled loans.

Block 906 illustrates using the data model for optimizing bundled payments. In at least one example, the machine-trained data model outputs a recommendation of how payment for paying at least portions of multiple loans should be allocated between the loans. The machine-trained data model can consider various factors in determining how to allocate a single payment for repaying one or more bundled loans. For instance, such factors include interest rates, APRs, lengths of loans, remaining balances, etc. As such, the machine-trained data model can determine allocations for balancing interest optimization, determine to pay more on a loan with a higher interest rate than a bundled loan with a lower interest rate, determine to allocate more to payment of a smaller loan (e.g., to pay it off faster) prior to a larger loan, etc. Further, in some examples, the machine-trained data model can recommend equal payments for each of the bundled loans, etc. As described above, loans can be bundled based on one or more aspects. For instance, in an example multiple loans can be bundled based on being associated with a specific payment instrument, a buyer account, a repayment schedule and/or time, repayment terms, and the like.

In some examples, as loans that are part of the bundled loans are paid off, different loans may be bundled differently over time. As such, the data model can intelligently determine how to allocate funds of a payment prior to each payment, at a recurring frequency, after a lapse in a period of time, etc. As a result, a payment can be used to repay portions of a first loan and a second loan for a first month and a subsequent payment can be used to repay the first loan and a third loan, the second loan and a third loan, or two new loans (e.g., a third loan and a fourth loan).

Figure 10:
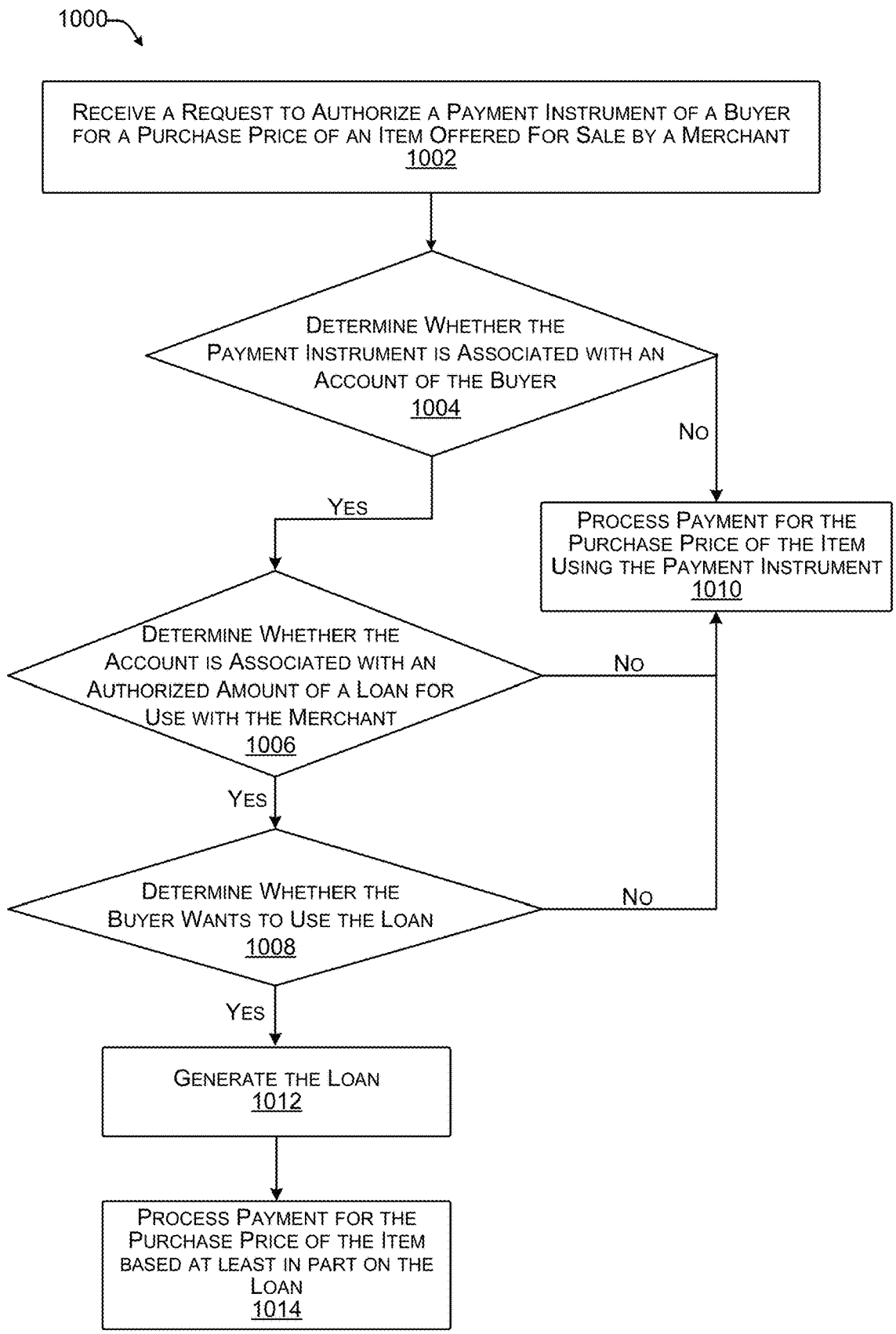
FIG. 10 illustrates an example process for processing a payment based at least in part on a loan.

FIG. 10 illustrates an example process 1000 for processing a payment based at least in part on a loan.

Block 1002 illustrates receiving a request to authorize a payment instrument of a buyer for a purchase price of an item offered for sale by the merchant. As described above, a merchant can utilize merchant computing device(s) 112 to interact with the payment processing service. In at least one example, merchant computing device(s) 112 can be associated with a merchant user interface 114 that enables the merchant to process POS transactions via the merchant computing device(s) 112. That is, the merchant user interface 114 can configure the merchant computing device(s) 112 as POS terminals for generating and transmitting transaction data (e.g., encrypted payment data, user authentication data, purchase amount information, point-of-purchase information, etc.) from the merchant computing device(s) 112 to the server computing device(s) 108. The server computing device(s) 108 can be associated with a merchant module that is configured to receive transaction data and process payments for POS transactions based on the transaction data. To process such payments, the merchant module is capable of communicating with server computing devices associated with payment services, such as card issuers, card networks, banks, etc.

In at least one example, the merchant user interface 114 can receive, for example, from a payment reader device, payment data associated with a payment instrument presented to satisfy a purchase price of an item that a buyer (e.g., the buyer 102) desires to purchase from a merchant. As described above, the payment data can include a name of the buyer, an address of the buyer, a type (e.g., credit, debit, etc.) of a payment instrument from which the payment data is accessed, a number associated with the payment instrument, a verification value (e.g., PVKI, PVV, CVV, CVC, etc.) associated with the payment instrument, an expiration date associated with the payment instrument, a PAN corresponding to the buyer (which may or may not match the number associated with the payment instrument), restrictions on what types of charges/debts may be made, etc.) associated with a payment instrument. The merchant user interface 114 can transmit transaction data, including the payment data, to the server computing device(s) 108 with a request to authorize the payment instrument for at least the purchase price of the item. The transaction data can identify the merchant, an amount to be authorized, an item to be purchased, etc.

Block 1004 illustrates determining whether the payment instrument is associated with an account of the buyer. As described above, in some examples, the buyer 102 can be associated with an account, which can be associated with a payment instrument. In at least one example, the merchant module associated with the server computing device(s) 108 can perform a lookup or other search to determine whether the payment instrument is associated with an account of the accounts 110.

Block 1006 illustrates determining whether the account is associated with an authorized amount of a loan for use with the merchant. Based at least in part on determining that the payment instrument is associated with an account (e.g., "yes" at block 1004), the merchant module can determine whether the payment instrument is associated with an authorized amount of a loan (e.g., a credit) for use with the merchant. In at least one example, the merchant module associated with the server computing device(s) 108 can access the account of the buyer 102 to determine whether the account is associated with an authorized amount of a loan for use with the merchant. If the account is associated with an authorized amount of a loan for use with the merchant (e.g., "yes" at block 1006), the merchant module can prompt the buyer 102 to determine whether the buyer 102 desires to use the loan, as illustrated in block 1008. If the payment instrument is not associated with an account of the buyer 102 (e.g., "no" at block 1004) and/or the account is not associated with an authorized amount of a loan for use with the merchant (e.g., "no" at block 1006), the merchant module can process payment of the purchase price of the item by sending an authorization request to a payment service (e.g., card issuers, card networks, banks, etc.) to determine whether the payment instrument is authorized for the purchase price of the item. If the payment instrument is authorized for the purchase price of the item, the merchant module can authorize the transaction. If the payment instrument is not authorized for the purchase price of the item, the merchant module can deny the transaction. That is, if the payment instrument is not associated with an account of the buyer 102 (e.g., "no" at block 1004) and/or the account is not associated with an authorized amount of a loan for use with the merchant (e.g., "no" at block 1006), the merchant module can process payment of the purchase price of the item using the payment instrument, as illustrated in block 1010.

In at least one example, the payment instrument can be associated with the authorized amount of the loan (e.g., the credit). However, in an additional or alternative example, the payment instrument may not be associated with the credit but, based on accessing the account using the payment instrument, the credit can be accessible via the payment instrument. That is, in an additional or alternative example, the credit can be associated with a different payment instrument than the payment instrument with which the request to authorize is associated (or no payment instrument at all), but can be accessible via the payment instrument provided at the POS.

Block 1008 illustrates determining whether the buyer wants to use the loan. In at least one example, based at least in part on determining that the account is associated with an authorized amount of a loan for use with the merchant (e.g., the account is associated with a credit), the merchant module can cause the merchant user interface 114 to prompt the buyer 102 to determine whether the buyer 102 desires to apply the credit to the transaction. In such an example, if the buyer 102 opts to apply the loan to cover the purchase price of the item or a portion of the purchase price (e.g., "yes" at block 1008), the merchant module can send an indication of the amount of the loan applied to the lending module 120 and the lending module 120 can generate a loan for the amount of the loan applied, as illustrated in block 1012. In such an example, the lending module 120 can distribute the funds to the buyer 102 and/or the merchant on the buyer's 102 behalf and the loan can enter a loan servicing state (e.g., repayment). If the buyer 102 does not want to use the loan for the transaction (e.g., "no" at block 1008), the merchant module can process the transaction as described above with reference to block 1010.

Block 1014 illustrates processing a payment for the purchase price of the item based at least in part on the loan. Based at least in part on applying the loan to the transaction, the merchant module can process payment for the purchase price of the item based at least in part on the loan. For example, if the amount of the loan is less than or equal to the purchase price, the merchant module can subtract the amount of the loan from the purchase price of the item and can process the payment instrument for the remaining amount. In such an example, the merchant module can process payment of the purchase price of the item by sending an authorization request to a payment service (e.g., card issuers, card networks, banks, etc.) to determine whether the payment instrument is authorized for the remaining amount. If the payment instrument is authorized for the remaining amount, the merchant module can authorize the transaction.

Figure 11:
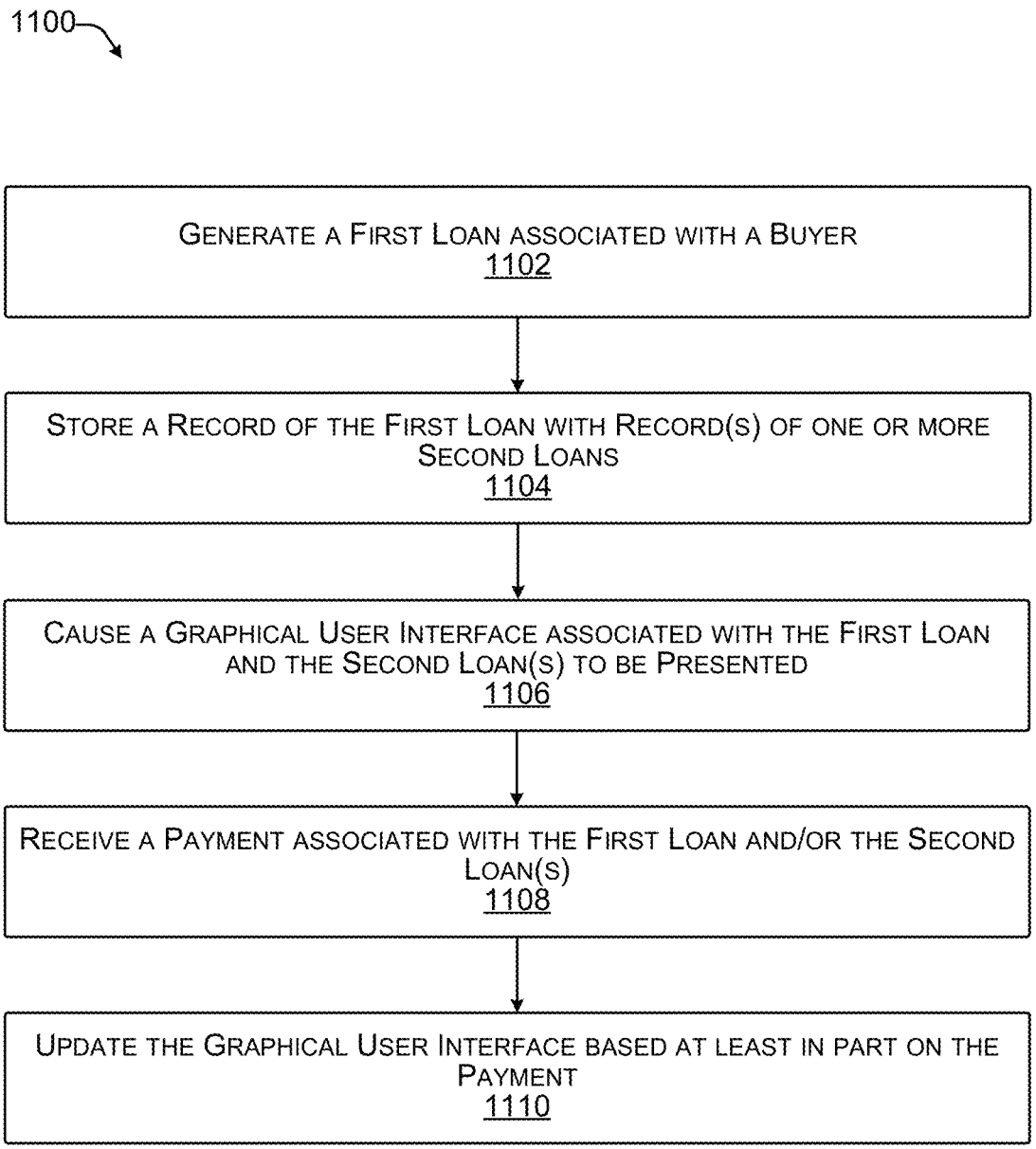
FIG. 11 illustrates an example process for generating and updating a GUI from which a buyer can manage activity associated with an account.

FIG. 11 illustrates an example process 1100 for generating and updating a GUI from which a buyer can manage activity associated with an account.

Block 1102 illustrates generating a first loan associated with a buyer. As described above, the lending module 120 can generate a loan for a buyer (e.g., the buyer 102) based at least in part on the buyer 102 applying a (preauthorized) amount of the loan to a transaction. In an alternative example, the lending module 120 can generate a loan responsive to the buyer 102 accepting an offer for the first loan. As described above, in at least one example, the loan can be financed by the payment processing service.

Block 1104 illustrates storing a record of the first loan with record(s) of one or more second loans. As described above, a record of the first loan can be stored in a data structure (e.g., database, data store, etc.) associated with, or otherwise accessible by, the server computing device(s) 108. Such a data structure can store records of the first loan and one or more other (e.g., second) loans associated with the buyer 102 (and other buyer(s)). In at least one example, such records can additionally or alternatively be associated with an account of the buyer 102. Such a record can indicate an amount of the first loan, terms of the first loan, payment(s) made on the first loan, etc.

Block 1106 illustrates causing a GUI associated with the first loan and the second loan(s) to be presented. As described above, the buyer user interface 118 can present a GUI associated with the first loan and the second loan(s). In some examples, the buyer user interface 118 can receive instructions for presenting the GUI from the server computing device(s) 108 and the buyer user interface 118 can execute the instructions to present the GUI. In other examples, the buyer user interface 118 can generate the instructions for presenting the GUI based at least in part on information received from the server computing device(s) 108. Non-limiting examples of such a GUI are described above with reference to FIGS. 1 and 2 (e.g., GUI 126).

Block 1108 illustrates receiving a payment associated with the first loan and/or the second loan(s). As described above, the buyer 102 can make payments to pay off portions of one or more loans. In at least one example, the buyer 102 can bundle repayment of two or more loans such that a portion of the payment can be allocated between the two or more loans. In some examples, such a payment can be received by the lending module 120 from an account of the buyer 102.

Block 1110 illustrates updating the GUI based at least in part on the payment. Based at least in part on receiving the payment, the buyer user interface 118 can update the GUI associated with the first loan and the second loan(s) to reflect the payment. In some examples, the buyer user interface 118 can receive instructions for presenting an updated GUI from the server computing device(s) 108 and the buyer user interface 118 can execute the instructions to present the updated GUI. In other examples, the buyer user interface 118 can generate the instructions for presenting the updated GUI based at least in part on information received from the server computing device(s) 108. In at least one example, the updated GUI can include updated information associated with repayment progress. Further, the updated GUI can include an indication of the payment.

Figure 12:
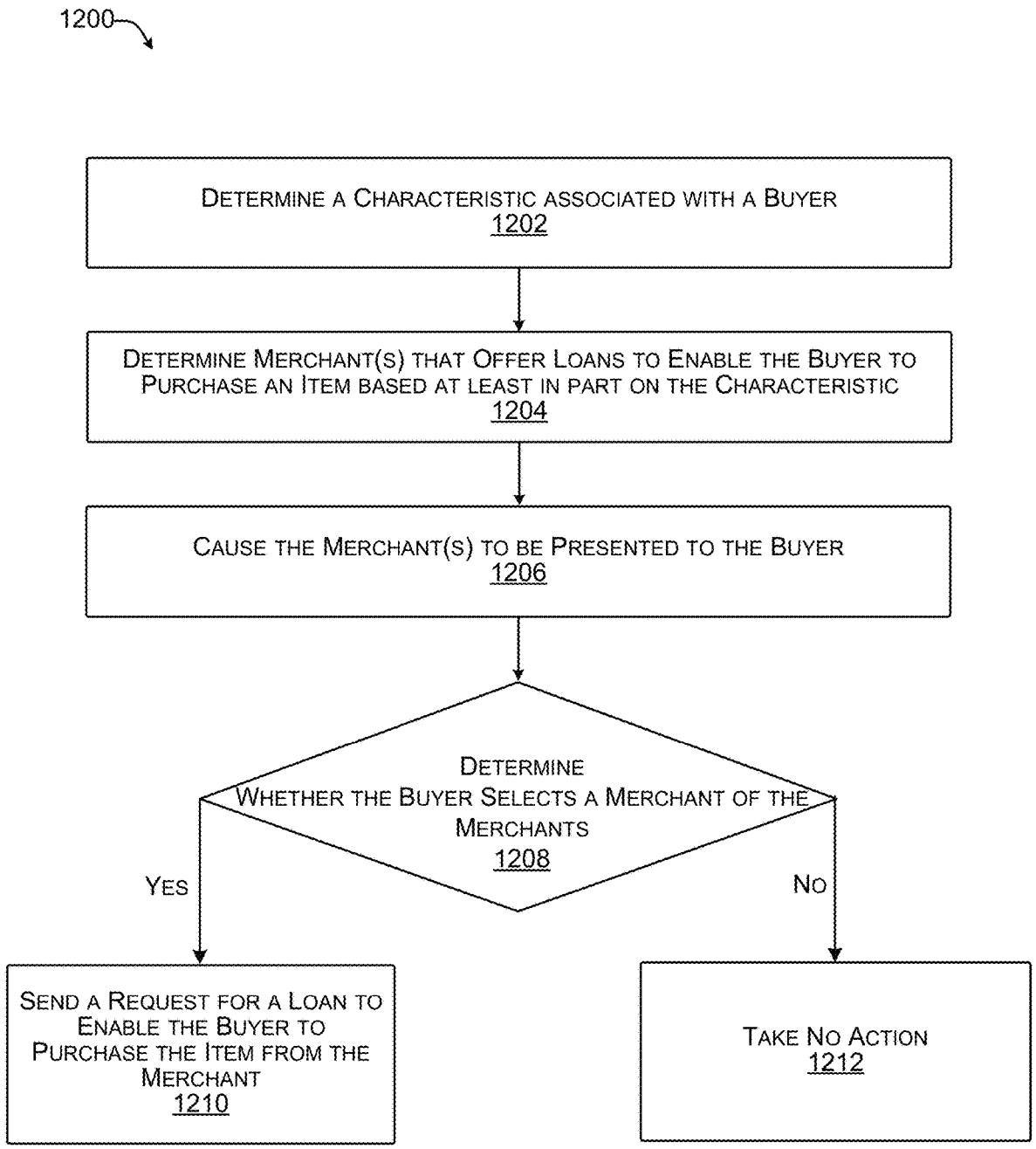
FIG. 12 illustrates an example process for intelligently surfacing merchants to a buyer.

FIG. 12 illustrates an example process 1200 for intelligently surfacing merchants to a buyer.

Block 1202 illustrates determining a characteristic associated with a buyer. As described above, the server computing device(s) 108 can store accounts 110, which can be associated with a plurality of merchants and/or a plurality of buyers. In some examples, the accounts 110 can include, or be associated with, buyer profiles. A buyer profile can be associated with buyer data ("characteristics") (e.g., name, phone number, address, banking information, etc.), buyer preferences (e.g., learned or buyer-specified), purchase history data (e.g., identifying one or more items purchased (and respective item information), payment instruments used to purchase the one or more items, returns associated with one or more orders, statuses of one or more orders (e.g., preparing, packing, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, interactions associated with such reservations, etc.), sharing history (e.g., items previously shared, previous requests to share an item (fulfilled or unfulfilled), etc.), buyer service data, etc. Additional or alternative buyer data can be stored in the buyer profiles. In at least one example, the lending module 120 can access an account of the buyer 102 to determine one or more characteristics associated with the buyer 102.

Block 1204 illustrates determining merchant(s) that offer loans to enable the buyer to purchase an item based at least in part on the characteristic. In some examples, the lending module 120 can utilize data stored in association with the accounts 110 to one or more merchants that are relevant to the buyer 102. In at least one example, the lending module 120 can utilize a buyer characteristic (e.g., of the buyer 102 and/or similar buyers) to determine merchant(s) that are relevant to a buyer 102. In at least one example, the lending module 120 can identify merchant(s) that are in a particular geolocation of the buyer 102 or are within a threshold distance of the particular geolocation (determined based on a geolocation provided by the buyer 102 (e.g., shipping address, billing address, etc.) and/or as observed from previous transaction data associated with previous transactions of the buyer with merchants of the payment processing service), merchant(s) that are within a particular price range (determined based on buyer spending patterns as determined from transaction data associated with previous transactions of the buyer with merchants of the payment processing service), have a particular rating (determined based on buyer patterns as determined from transaction data associated with previous transactions of the buyer with merchants of the payment processing service), etc. In some examples, the lending module 120 can rank two or more merchants based on buyer characteristics and/or merchant characteristics, such that the most relevant merchants are presented to the buyer 102 prior to less relevant merchants being presented to the buyer 102.

In at least one example, the lending module 120 can utilize machine-trained data models (e.g., data models trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc.), statistics, or other processes for identifying relevant merchant(s) and/or ranking merchants based on relevance. For example, a machine learning mechanism can analyze training data (e.g., buyer data, POS transaction data, merchant data, etc.) to train a data model that outputs a score, or other indication, indicating a relevance of a merchant to a buyer. Such scores, or other indications, can be used to identify relevant merchants and/or subsets of relevant merchants (e.g., based on whether individual scores meet or exceed a threshold, etc.).

Block 1206 illustrates causing the merchant(s) to be presented to the buyer. In at least one example, based at least in part on determining one or more merchants to recommend to the buyer 102, the lending module 120 can cause representations of such merchant(s) to be presented via the buyer user interface 118. A GUI for presenting the merchant(s) to the buyer 102 can include user interface elements that correspond to each of the merchant(s). In some examples, the user interface elements can be associated with selectable controls which enable the buyer 102 to select a merchant.

Block 1208 illustrates determining whether the buyer selects a merchant of the merchants. The buyer 102 can interact with the GUI to select a merchant and the buyer user interface 118 can send an indication of the selection to the lending module 120. In at least one example, responsive to the buyer 102 selecting a merchant (e.g., "yes" at block 1208), the buyer user interface 118 can send a request for a loan to enable the buyer 102 to purchase item(s) from the merchant, as illustrated in block 1210. Such a request can be associated with the indication of the selection or can be a different transmission. As described above, the lending module 120 can then use such information in determining whether the buyer 102 is qualified for a loan and/or the terms of the loan. If the buyer 102 does not select a merchant (e.g., "no" at block 1208), the buyer user interface 118 and/or the lending module 120 can take no action, as illustrated in block 1212.

While FIG. 12 is described with reference to "a characteristic of a buyer," in an additional or alternative example, a characteristic of a cohort of buyers can be used to identify relevant merchant(s). In such an example, the cohort of buyers can be similar to the buyer 102 (e.g., as determined by a similarity analysis, shared characteristics, or the like).

Figure 13:
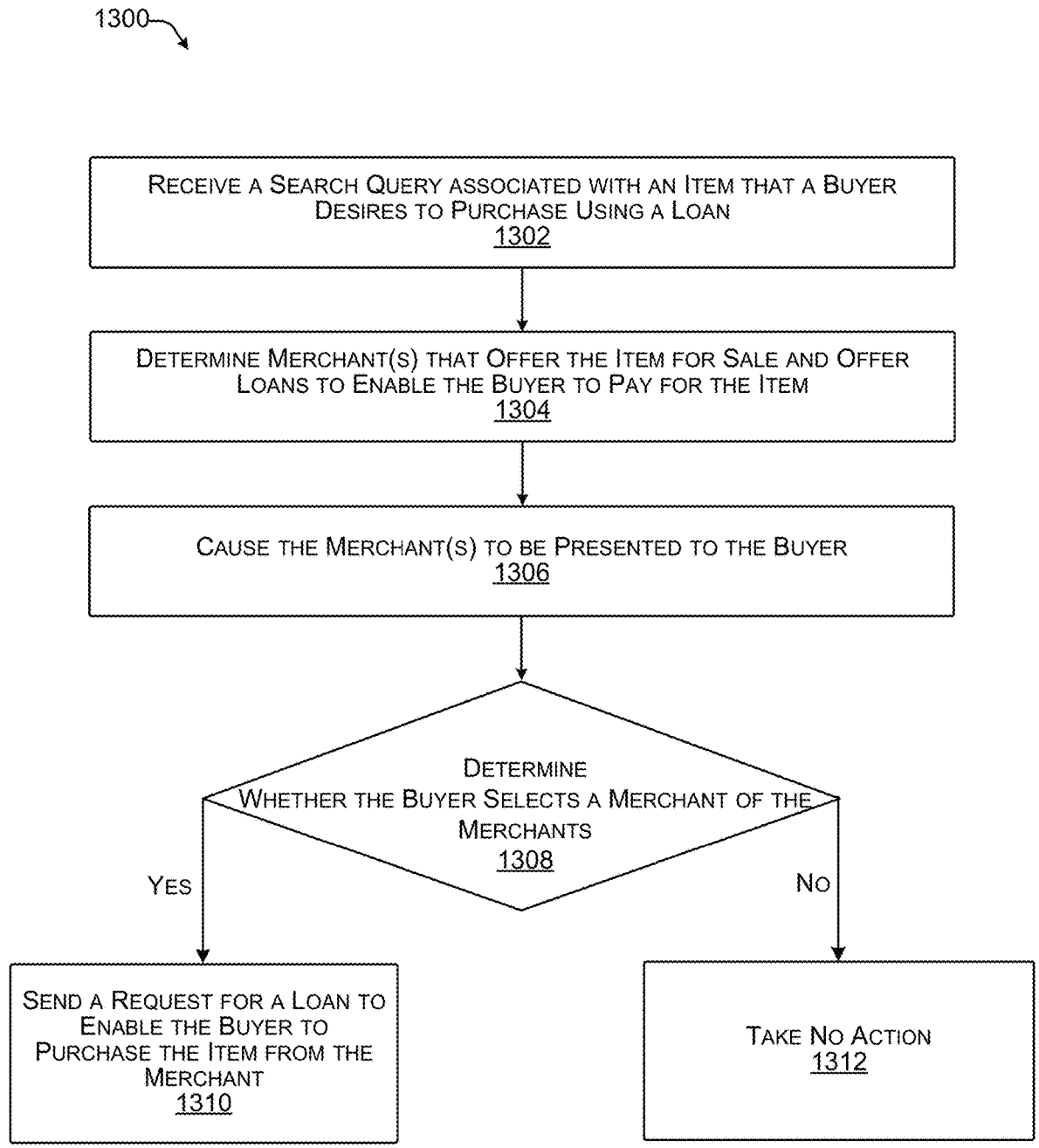
FIG. 13 illustrates another example process for intelligently surfacing merchants to a buyer.

FIG. 13 illustrates an example process 1300 for intelligently surfacing merchants to a buyer.

Block 1302 illustrates receiving a search query associated with an item that a buyer desires to purchase using a loan. In at least one example, the buyer 102 can provide input to initiate a search for merchants that (i) offer loans via the payment processing service and (ii) offer a particular item for sale. In some examples, the buyer 102 can provide such input via a search user interface element, as illustrated above with reference to FIG. 3. As described above, in at least one example, the GUI 300 can include a user interface element 302 which prompts the buyer 102 to input an item. Responsive to receiving an input, the buyer user interface 118 can submit a query to the server computing device(s) 108. The lending module 120 can receive the query.

Block 1304 illustrates determining merchant(s) that offer the item for sale and offer loans to enable the buyer to purchase an item. The lending module 120 can receive the query and determine one or more merchants that offer loans to enable the byer to purchase the item. For example, if the input is an item, the lending module 120 can perform a lookup, or other search, of the accounts 110 to identify merchants that (i) offer loans via the payment processing service and (ii) offer the item for sale. The lending module 120 can generate a list of one or more merchants that both (i) offer loans via the payment processing service and (ii) offer the item for sale.

In some examples, the lending module 120 can utilize data stored in association with the accounts 110 to select a subset of the one or more merchants that are most relevant to the buyer 102, responsive to receiving the query. That is, in at least one example, the lending module 120 can utilize a buyer characteristic (e.g., of the buyer 102 and/or similar buyers) to determine a subset of buyers 102 that are relevant to a buyer 102. In at least one example, the lending module 120 can identify a subset of merchants that are in a particular geolocation of the buyer 102 or are within a threshold distance of the particular geolocation (determined based on a geolocation provided by the buyer 102 (e.g., shipping address, billing address, etc.) and/or as observed from previous transaction data associated with previous transactions of the buyer with merchants of the payment processing service), a subset of merchants that are within a particular price range (determined based on buyer spending patterns as determined from transaction data associated with previous transactions of the buyer with merchants of the payment processing service), have a particular rating (determined based on buyer patterns as determined from transaction data associated with previous transactions of the buyer with merchants of the payment processing service), etc. In some examples, the lending module 120 can rank merchants based on buyer characteristics and/or merchant characteristics, such that the most relevant merchants are presented to the buyer 102 prior to less relevant merchants being presented to the buyer 102. As described above, in at least one example, the lending module 120 can utilize machine-trained data models, statistics, or other processes for identifying relevant merchants and/or ranking merchants based on relevance.

Block 1306 illustrates causing the merchant(s) to be presented to the buyer. In at least one example, based at least in part on determining one or more merchants to recommend to the buyer 102, the lending module 120 can cause representations of such merchant(s) to be presented via the buyer user interface 118. A GUI, such as the GUI 300 described above with reference to FIG. 3, for presenting the merchant(s) to the buyer 102 can include user interface elements that correspond to each of the merchant(s). In some examples, the user interface elements can be associated with selectable controls which enable the buyer 102 to select a merchant.

Block 1308 illustrates determining whether the buyer selects a merchant of the merchants. The buyer 102 can interact with the GUI to select a merchant and the buyer user interface 118 can send an indication of the selection to the lending module 120. In at least one example, responsive to the buyer 102 selecting a merchant (e.g., "yes" at block 1308), the buyer user interface 118 can send a request for a loan to enable the buyer 102 to purchase item(s) from the merchant, as illustrated in block 1310. Such a request can be associated with the indication of the selection, or can be a different transmission. As described above, the lending module 120 can then use such information in determining whether the buyer 102 is qualified for a loan and/or the terms of the loan. If the buyer 102 does not select a merchant (e.g., "no" at block 1308), the buyer user interface 118 and/or the lending module 120 can take no action, as illustrated in block 1312.

While FIG. 13 refers to receiving a search query for an item, as described above, in additional or alternative examples, such a query can be associated with an item category, a MCC, a merchant, etc. In such examples, process 1300 can be similarly performed. Furthermore, while FIG. 13 is described with reference to "a characteristic of a buyer," in an additional or alternative example, a characteristic of a cohort of buyers can be used to identify relevant merchant(s). In such an example, the cohort of buyers can be similar to the buyer 102 (e.g., as determined by a similarity analysis, shared characteristics, or the like).

Figure 14:
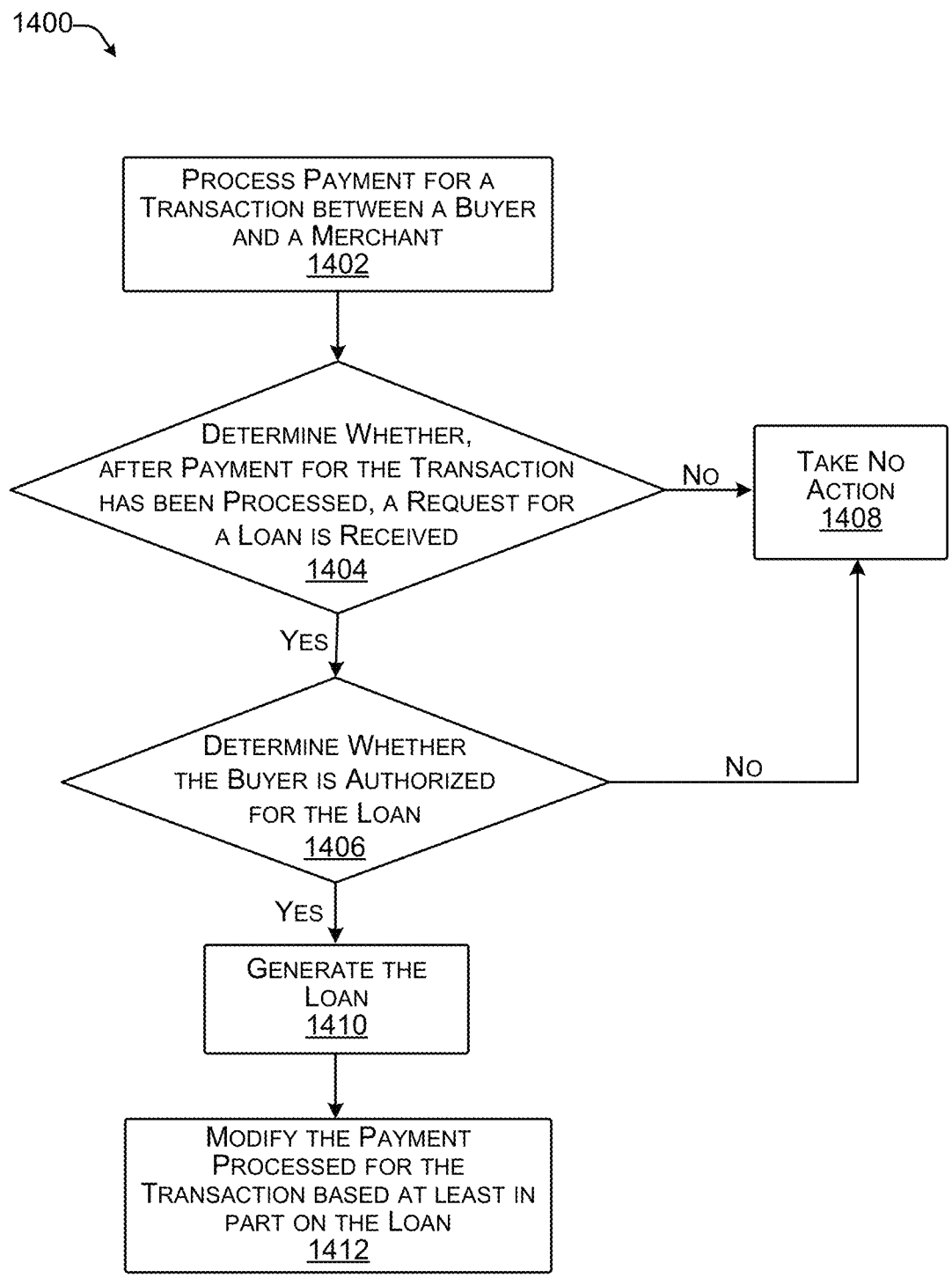
FIG. 14 illustrates an example process for generating a loan after a transaction and modifying a payment processed for the transaction based at least in part on the loan.

FIG. 14 illustrates an example process 1400 for generating a loan after a transaction and modifying a payment processed for the transaction based at least in part on the loan. That is, FIG. 14 is directed to changing a funding source of a transaction after the transaction has been processed. In at least one example, operations described below with reference to FIG. 14 can be tied to a physical card associated with multiple logical accounts.

Block 1402 illustrates processing payment for a transaction between a buyer and a merchant. As described above, a merchant can utilize merchant computing device(s) 112 to interact with the payment processing service. In at least one example, merchant computing device(s) 112 can be associated with a merchant user interface 114 that enables the merchant to process POS transactions via the merchant computing device(s) 112. The server computing device(s) 108 can be associated with a merchant module that is configured to receive transaction data and process payments for POS transactions based on the transaction data. To process such payments, the merchant module is capable of communicating with server computing devices associated with payment services, such as card issuers, card networks, banks, etc.

In at least one example, the merchant user interface 114 can receive, for example, from a payment reader device, payment data associated with a payment instrument presented to satisfy a purchase price of an item that a buyer (e.g., the buyer 102) desires to purchase from a merchant. As described above, the payment data can include a name of the buyer, an address of the buyer, a type (e.g., credit, debit, etc.) of a payment instrument from which the payment data is accessed, a number associated with the payment instrument, a verification value (e.g., PVKI, PVV, CVV, CVC, etc.) associated with the payment instrument, an expiration date associated with the payment instrument, a PAN corresponding to the buyer (which may or may not match the number associated with the payment instrument), restrictions on what types of charges/debts may be made, etc.) associated with a payment instrument. The merchant user interface 114 can transmit transaction data, including the payment data, to the server computing device(s) 108 with a request to authorize the payment instrument for at least the purchase price of the item. The server computing device(s) 108 can process payment for the transaction (e.g., determine that the payment instrument is authorized for the cost of the transaction and notify the buyer 102 and/or the merchant).

Block 1404 illustrates determining whether, after payment for the transaction has been processed, a request for a loan has been received. In some examples, after payment for the transaction has been processed, the buyer 102 can interact with the buyer user interface 118 to request that the transaction, or a portion of a transaction, be paid for via a loan. Such a request can represent a request to apply for a loan. In at least one example, the buyer user interface 118 can present a transaction summary via a GUI and the buyer 102 can interact with the GUI to generate the request. In an additional or alternative example, the buyer 102 can receive a digital receipt that include an offer for a loan or prompts the buyer 102 to apply for a loan.

In some examples, the buyer 102 can also be a merchant (e.g., a merchant that is buying from another merchant via business to business transactions, etc.). In such examples, the buyer 102 can interact with the merchant user interface 114 to request that the transaction, or a portion of the transaction, be paid for via a loan. Similarly, such a request can represent a request to apply for a loan. In at least one example, the merchant user interface 114 can present a transaction summary via a GUI and the merchant can interact with the GUI to generate the request. In some examples, when the buyer 102 is a merchant the subscribes to services offered by the payment processing service, the buyer 102 can request to apply for a loan for a POS transaction, a payroll payment (e.g., made to one or more employees), or other transactions of the like. In examples where the buyer 102 is a merchant, the loan referenced may not be a "consumer" loan as described above but may instead be a "capital" loan used for business purposes. In either example, such a loan can be offered by the payment processing service and the buyer 102 can repay the amount of the loan (plus fees and/or interest, if applicable) via one or more installments.

Block 1406 illustrates determining whether the buyer is authorized for the loan. As described above, the lending module 120 can receive the request and can determine whether the buyer 102 is qualified for a loan for the transaction and/or terms of the loan. For instance, the lending module 120 can analyze the request, which can include an amount requested and a merchant associated with the request, in view of the accounts 110 (e.g., of the buyer 102 and/or the relevant merchant, buyers similar to the buyer, etc.) and one or more other lending risk signals (e.g., indicative of creditworthiness) to determine whether the buyer 102 qualifies for the loan and/or the terms of the loan. In at least one example, the lending module 120 can utilize machine-trained data models (e.g., data models trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc.), statistics, or other processes for determining whether the buyer 102 is qualified for the loan and/or terms of the loan. If the buyer 102 is not authorized for the loan (e.g., "no" at block 1406), the lending module 120 and/or the merchant module can refrain from taking any action (e.g., take no action), as illustrated in block 1408.

Block 1410 illustrates generating the loan. Based at least in part on determining that the buyer 102 is authorized for the loan (e.g., "yes" at block 1406), the lending module 120 can generate the loan. That is, the lending module 120 can associate the loan with an account of the buyer 102 and can modify the payment processed for the transaction based at least in part on the loan, as block 1412 illustrates. In at least one example, the lending module 120 can notify the merchant module that a loan is to be applied to the transaction. The merchant module can refund a portion of the cost of the transaction that corresponds to the amount of the loan to the payment instrument (or original form of payment). In some examples, the merchant module may not yet have captured the cost of the transaction (that is, the merchant module sent an authorization request, which was approved, but has not yet sent the capture request to capture the funds). In such examples, the merchant module can send a capture request for the difference between the original cost of the transaction and the amount of the loan. That is, the merchant module need not refund anything to the payment instrument (or the original form of payment) and need only modify the amount requested via the capture request. Responsive to the loan being generated, the loan can be subject to bundling with one or more other loans, as described above.

Figure 15:
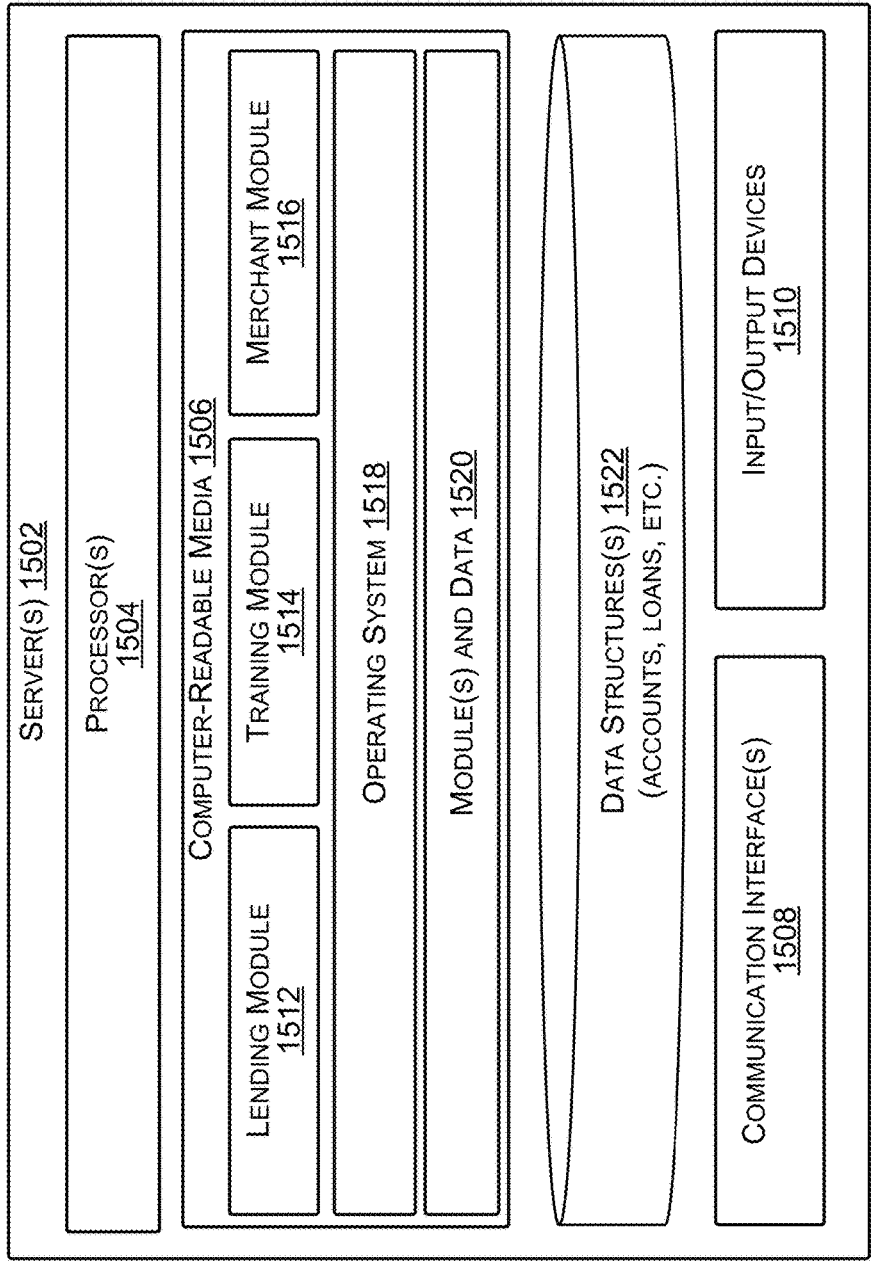
FIG. 15 illustrates an example server computing system for performing techniques as described herein.

FIG. 15 illustrates an example server computing system 1500 for performing techniques as described herein. As described above, merchant computing device(s) and/or buyer computing device(s) can communicate with one or more server computing devices comprising the server computing system 1500 described herein.

The server(s) 1502 comprising the server computing system 1500 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1502 as being present in a single location, these components and data can alternatively be distributed across different computing devices and different locations in any manner. In some examples, such components and data can be distributed across user computing devices, as described herein. The functions can be implemented by one or more server computing devices, with the various functionality described above distributed in various ways across the different computing devices. Multiple server(s) 1502 can be located together or separately, and organized, for example, as virtual servers, server banks and/or server farms. The described functionality can be provided by the servers of a single merchant or enterprise, or can be provided by the servers and/or services of multiple different buyers or enterprises.

In the illustrated example, the server(s) 1502 can include one or more processors 1504, one or more computer-readable media 1506, one or more communication interfaces 1508, and one or more input/output devices 1510. Each processor 1504 can be a single processing unit or a number of processing units, and can include single or multiple computing units or multiple processing cores. The processor(s) 1504 can be implemented as one or more microprocessors, microcomputers, microcontrollers, digital signal processors, central processing units, state machines, logic circuitries, and/or any devices that manipulate signals based on operational instructions. For example, the processor(s) 1504 can be one or more hardware processors and/or logic circuits of any suitable type specifically programmed or configured to execute the algorithms and processes described herein. The processor(s) 1504 can be configured to fetch and execute computer-readable instructions stored in the computer-readable media 1506, which can program the processor(s) 1504 to perform the functions described herein.

The computer-readable media 1506 can include volatile and nonvolatile memory and/or removable and non-removable media implemented in any type of technology for storage of information, such as computer-readable instructions, data structures, program modules, or other data. Such computer-readable media 1506 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1502, the computer-readable media 1506 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1506 can be used to store any number of functional components that are executable by the processors 1504. In many implementations, these functional components comprise instructions or programs that are executable by the processors 1504 and that, when executed, specifically configure the one or more processors 1504 to perform the actions attributed above to the service provider and/or payment processing service. Functional components stored in the computer-readable media 1506 can include a lending module 1512, a training module 1515, and a merchant module 1516. The lending module 1512 can perform operations as described above. The training module 1514 can access training data for training data models using machine-learning mechanisms, as described above. The merchant module 1516 can process POS transactions, as described above.

Additional functional components stored in the computer-readable media 1506 can include an operating system 1518 for controlling and managing various functions of the server(s) 1502. In at least one example, the computer-readable media 1506 can include or maintain other functional components and data, such as other modules and data 1520, which can include programs, drivers, etc., and the data used or generated by the functional components. Further, the server(s) 1502 can include many other logical, programmatic and physical components, of which those described above are merely examples that are related to the discussion herein.

In at least one example, the computer-readable media 1506 can store one or more data structures 1522. In additional or alternative examples, one or more data structures 1522 can be remotely located and accessible to the computer-readable media 1506. The one or more data structures 1522 can store data associated with accounts 110, data associated with loans or other financing methods, etc. In at least one example, the data structure(s) 1522 can be databases. In additional or alternative examples, the data structure(s) 1522 can be any type of data storage or data repository.

In some examples, the data structure(s) 1522 can store data associated with accounts 110, which can include or be associated with buyer profiles and merchant profiles. Buyer profiles and associated buyer data are described above. Merchant profiles, which can be associated with merchant profiles of two or more unrelated merchants (e.g., merchants that are different legal entities that do not share accounting, employees, branding, etc., having different names, EINs, lines of business (in some examples), inventories (or at least portions thereof) and/or the like), can include merchant data associated with a merchant including, but not limited to, a merchant category classification (MCC), item(s) offered for sale by the merchant (e.g., inventory), transaction data associated with transactions conducted by the merchant (e.g., POS transactions), bank information associated hardware (e.g., device type) used by the merchant, geolocations of physical stores of the merchant, previous loans made to the merchant, previous defaults on said loans, an indication of risk (e.g., based at least in part on fraud, chargeback, etc.) associated with the merchant, etc. In at least one example, a merchant profile can be mapped to, or otherwise associated with, a portion of the inventory database 158 associated with the merchant's inventory. A merchant profile can store additional or alternative types of merchant data.

The communication interface(s) 1508 can include one or more interfaces and hardware components for enabling communication with various other devices, such as over the network(s) 1408. For example, communication interface(s) 1508 can enable communication through one or more of the Internet, cable networks, cellular networks, wireless networks (e.g., Wi-Fi) and wired networks, as well as close-range communications such as Bluetooth®, BLE, and the like, as additionally enumerated elsewhere herein.

The server(s) 1502 can further be equipped with various input/output (I/O) devices 1510. Such I/O devices 1510 can include a display, various user interface controls (e.g., buttons, joystick, keyboard, mouse, touch screen, etc.), audio speakers, connection ports and so forth. In at least one example, the server(s) 1502 can further include one or more timers 1530 for tracking time, as described above.

Figure 16:
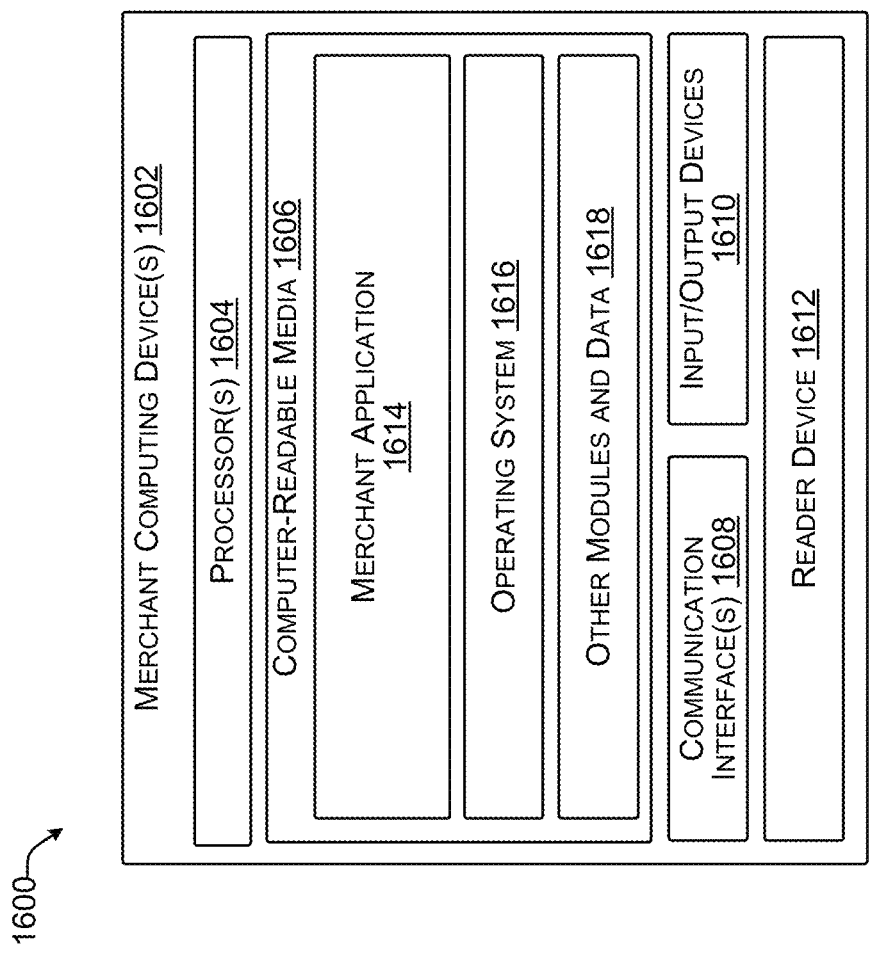
FIG. 16 illustrates an example merchant computing system for performing techniques as described herein.

FIG. 16 illustrates an example merchant computing system 1600 for performing techniques as described herein. The merchant computing system 1600 can comprise one or more merchant computing device(s) 1602, which can be any suitable type of computing device, e.g., portable, semi-portable, semi-stationary, or stationary. Some examples of the merchant computing device(s) 1602 can include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein. The merchant computing device(s) 112 can correspond to the merchant computing device(s) 1602 as described herein.

The merchant computing device(s) 1602 are shown as a single device; however, in some examples, the merchant computing device(s) 1602 can comprise multiple computing devices that are in communication with one another to perform functions attributed to the merchant computing device(s) 1602.

In the illustrated example, the merchant computing device(s) 1602 can include one or more processors 1604, one or more computer-readable media 1606, one or more communication interfaces 1608, one or more input/output devices 1610, and a reader device 1612. Each processor 1602 can be a single processing unit or a number of processing units, and can include single or multiple computing units or multiple processing cores. The processor(s) 1604 can be implemented as one or more microprocessors, microcomputers, microcontrollers, digital signal processors, central processing units, state machines, logic circuitries, and/or any devices that manipulate signals based on operational instructions. For example, the processor(s) 1604 can be one or more hardware processors and/or logic circuits of any suitable type specifically programmed or configured to execute the algorithms and processes described herein. The processor(s) 1604 can be configured to fetch and execute computer-readable instructions stored in the computer-readable media 1606, which can program the processor(s) 1604 to perform the functions described herein.

The computer-readable media 1606 can include volatile and nonvolatile memory and/or removable and non-removable media implemented in any type of technology for storage of information, such as computer-readable instructions, data structures, program modules, or other data. Such computer-readable media 1606 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the merchant computing device(s) 1602, the computer-readable media 1606 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1606 can be used to store any number of functional components that are executable by the processors 1602. In many implementations, these functional components comprise instructions or programs that are executable by the processors 1602 and that, when executed, specifically configure the one or more processors 1602 to perform the actions attributed above to the service provider and/or payment processing service. Functional components stored in the computer-readable media 1606 can include a merchant application 1614. The merchant application 1614 can perform operations as described above with reference to the merchant user interface 114.

In addition to the operations performed by the merchant user interface 114 described above, in at least one example, the merchant application 1614 can configure the merchant computing device(s) 1602 to, collectively with the reader device 1612, process one or more transactions and transmit transaction data associated with the one or more transactions to the server(s) 1502. That is, the merchant application 1614 can configure the merchant computing device(s) 1602 as a POS terminal to, among other things, process transactions via the payment processing service (e.g., the server(s) 1502). In at least one example, the merchant application 1614 can present various GUIs to enable a merchant to conduct transactions, receive payments, and so forth. In at least one example, the merchant application 1614 can send data associated with the payments (e.g., transaction data) to the server(s) 1002.

The merchant application 1614 can additionally provide various functionalities to enable merchants to use the payment processing service. In at least one example, the merchant application 1614 can enable merchants to interact with the payment processing service for inventory management services, payroll services, financing services (e.g., loan services), delivery services, restaurant management services, etc. Further, the merchant application 1614 can enable the merchant to manage transactions, payments, and so forth, via a dashboard. For the purpose of this discussion, a "dashboard" can be a user interface that provides an at-a-glance view of key information (e.g., associated with transactions, payments, etc.).

Additional functional components stored in the computer-readable media 1606 can include an operating system 1616 for controlling and managing various functions of the merchant computing device(s) 1602. In at least one example, the computer-readable media 1606 can include or maintain other functional components and data, such as other modules and data 1618, which can include programs, drivers, etc., and the data used or generated by the functional components. Further, the merchant computing device(s) 1602 can include many other logical, programmatic and physical components, of which those described above are merely examples that are related to the discussion herein.

The communication interface(s) 1608 can include one or more interfaces and hardware components for enabling communication with various other devices, such as over the network(s) 1408. For example, communication interface(s) 1608 can enable communication through one or more of the Internet, cable networks, cellular networks, wireless networks (e.g., Wi-Fi) and wired networks, as well as close-range communications such as Bluetooth®, BLE, and the like, as additionally enumerated elsewhere herein.

The merchant computing device(s) 1602 can further be equipped with various input/output (I/O) devices 1610. Such I/O devices 1610 can include a display, various user interface controls (e.g., buttons, joystick, keyboard, mouse, touch screen, etc.), audio speakers, connection ports and so forth.

In at least one example, the merchant computing device(s) 1602 can further a reader device 1612 for reading payment instruments. In some examples, the reader device 1612 can plug in to a port in the merchant computing device(s) 1602, such as a microphone/headphone port, a data port, or other suitable port. The reader device 1612 can include a read head for reading a magnetic strip of a payment card, and further can include encryption technology for encrypting the information read from the magnetic strip. Additionally or alternatively, the reader device 1612 can be an EMV payment reader, which in some examples, can be embedded in the merchant computing device(s) 1602. Moreover, numerous other types of readers can be employed with the merchant computing device(s) 1602 herein, depending on the type and configuration of the merchant computing device(s) 1602. In some examples, the reader device 1612 can comprise a second device that can be coupled to the merchant computing device 1610. In at least one example, such a second device can be associated with its own input/output devices for presenting GUIs to facilitate payment processing.

Figure 17:
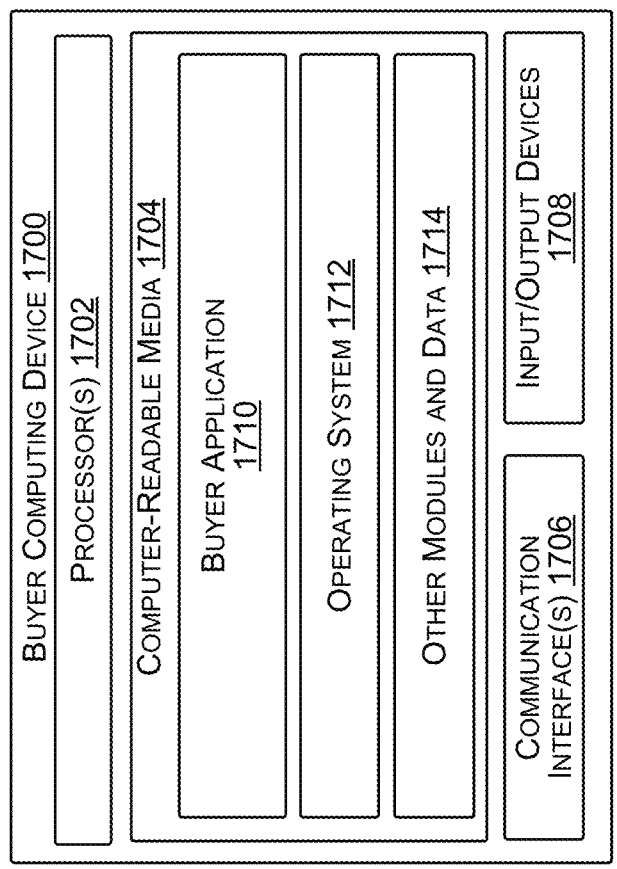
FIG. 17 illustrates an example buyer computing device for performing techniques as described herein.

FIG. 17 illustrates an example buyer computing device 1700 for performing techniques as described herein. The buyer computing device 1700, which can correspond to the buyer computing device 116, can be any suitable type of computing device, e.g., portable, semi-portable, semi-stationary, or stationary. Some examples of the buyer computing device 1700 can include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein. In at least one example, the buyer computing device 116 described above with reference to FIG. 1 can be the buyer computing device 1700.

The buyer computing device 1700 is shown as a single device; however, in some examples, the buyer computing device 1700 can comprise multiple computing devices that are in communication with one another to perform functions attributed to the buyer computing device 1700.

In the illustrated example, the buyer computing device 1700 can include one or more processors 1702, one or more computer-readable media 1704, one or more communication interfaces 1706, and one or more input/output devices 1708. Each processor 1702 can be a single processing unit or a number of processing units, and can include single or multiple computing units or multiple processing cores. The processor(s) 1702 can be implemented as one or more microprocessors, microcomputers, microcontrollers, digital signal processors, central processing units, state machines, logic circuitries, and/or any devices that manipulate signals based on operational instructions. For example, the processor(s) 1702 can be one or more hardware processors and/or logic circuits of any suitable type specifically programmed or configured to execute the algorithms and processes described herein. The processor(s) 1702 can be configured to fetch and execute computer-readable instructions stored in the computer-readable media 1704, which can program the processor(s) 1702 to perform the functions described herein.

The computer-readable media 1704 can include volatile and nonvolatile memory and/or removable and non-removable media implemented in any type of technology for storage of information, such as computer-readable instructions, data structures, program modules, or other data. Such computer-readable media 1704 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the buyer computing device 1700, the computer-readable media 1704 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1704 can be used to store any number of functional components that are executable by the processors 1702. In many implementations, these functional components comprise instructions or programs that are executable by the processors 1702 and that, when executed, specifically configure the one or more processors 1702 to perform the actions attributed above to the customer. Functional components stored in the computer-readable media 1704 can include a buyer application 1710. In at least one example, the buyer application 1710 can perform operations as described above with reference to the buyer user interface 118.

Additional functional components stored in the computer-readable media 1704 can include an operating system 1712 for controlling and managing various functions of the buyer computing device 1700. In at least one example, the computer-readable media 1704 can include or maintain other functional components and data, such as other modules and data 1714, which can include programs, drivers, etc., and the data used or generated by the functional components. Further, the buyer computing device 1700 can include many other logical, programmatic and physical components, of which those described above are merely examples that are related to the discussion herein.

The communication interface(s) 1706 can include one or more interfaces and hardware components for enabling communication with various other devices, such as over the network(s) 1408. For example, communication interface(s) 1706 can enable communication through one or more of the Internet, cable networks, cellular networks, wireless networks (e.g., Wi-Fi) and wired networks, as well as close-range communications such as Bluetooth®, BLE, and the like, as additionally enumerated elsewhere herein.

The buyer computing device 1700 can further be equipped with various input/output (I/O) devices 1708. Such I/O devices 1708 can include a display, various user interface controls (e.g., buttons, joystick, keyboard, mouse, touch screen, etc.), audio speakers, connection ports and so forth.

The aforementioned description is directed to devices and applications that are related, in part, to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments. Techniques described herein can be configured to operate in both real-time/online and offline modes. Further, techniques described herein are directed to transactions between buyers and merchants, but such techniques can be applicable for any type of entity and should not be limited to use by buyers and merchants.

While the aforementioned disclosure makes reference to user interactions via a UI presented via a display of a device, the UI can be presented via any input/output device. As an example, the UI can be output via a speaker, and augmented reality (AR) display, a virtual reality (VR) display, etc. That is, in some examples, the interactive image(s) can be presented via a speaker or an augmented reality and/or virtual reality environment. VR is an immersive experience, which simulates physical presence in a real or imagined environment. For example, a VR environment can immerse a physical, real-world person with computer-generated graphics (e.g., a dog, a castle, etc.) in a computer-generated, virtual scene via a VR display device. AR is a hybrid reality experience, which merges real worlds and virtual worlds. AR is a technology that produces AR environments where a physical, real-world person and/or objects in physical, real-world scenes co-exist with virtual, computer-generated people and/or objects in real time. For example, a AR environment can augment a physical, real-world scene and/or a physical, real-world person with computer-generated graphics (e.g., a dog, a castle, etc.) in the physical, real-world scene viewed via a AR display device.

Further, while the aforementioned disclosure makes reference to the merchant and/or buyer interacting with the UI via a selectable control or touch input, in additional or alternative examples, the merchant can indicate a selection via a spoken input or other type of input.

Reference to an "embodiment" in this document does not limit the described elements to a single embodiment; all described elements may be combined in any embodiment in any number of ways. Furthermore, for the purposes of interpreting this specification, the use of "or" herein means "and/or" unless stated otherwise. The use of "a" or "an" herein means "one or more" unless stated otherwise. The use of "comprise," "comprises," "comprising," "include," "includes," and "including" are interchangeable and not intended to be limiting. Also, unless otherwise stated, the use of the terms such as "first," "second," "third," "upper," "lower," and the like do not denote any spatial, sequential, or hierarchical order or importance, but are used to distinguish one element from another. It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B).

As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

It should also be appreciated by those skilled in the art that any block diagrams, steps, or sub-processes herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown. The order in which the methods are described are not intended to be construed as a limitation, and any number of the described method blocks can be deleted, moved, added, subdivided, combined, and/or modified in any order to implement the methods, or an alternative combination or sub-combinations. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples; alternative implementations can employ differing values or ranges. Furthermore, the methods can be implemented in any suitable hardware, software, firmware, or combination thereof.

The foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process limitations (e.g., dimensions, configurations, components, process step order, etc.) can be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A system for bundling repayment of two or more loans comprising:
   one or more processors; and
   one or more computer-readable media that, when executed by the one or more processors, cause the one or more processors to perform operations comprising:
      training a machine-trained data model to allocate portions of a payment amount for making bundled payments on multiple loans, the training the machine-trained data model including accessing, in a data structure, training data including account information related to a plurality of transactions between a plurality of buyers and a plurality of merchants;
      receiving, from an application executing on a buyer computing device of a buyer, a first request for a first loan to enable a buyer to purchase a first item from a first merchant;
      generating the first loan based at least in part on determining that the buyer purchased the first item, wherein the first loan is associated with a first balance based on an actual purchase price of the first item;
      determining to bundle repayment of the first loan with repayment of at least a second loan of the buyer as a single payment from an account of the buyer;
      using the machine-trained data model to determine, based at least on account information of the buyer, an allocation of the single payment between repayment of at least a portion of the first loan and at least a portion of the second loan;
      automatically repaying, based on the allocation determined using the machine-trained data model, at least the portion of the first loan and at least the portion of the second loan via the single payment from the account of the buyer; and
      causing, at least in part, a graphical user interface (GUI) to be presented by the buyer computing device via the application, wherein the GUI presents an indication of the portion of the first loan and the portion of the second loan included for repayment in the single payment from the account of the buyer.

2. The system as claim 1 recites, wherein the first merchant is associated with a payment processing service and the operations further comprise:
   receiving a second request to enable the buyer to purchase a second item from a second merchant associated with the payment processing service; and
   generating the second loan based on determining that the buyer purchased the second item, wherein the second loan is associated with a second balance based on an actual purchase price of the second item.

3. The system as claim 2 recites, wherein the first merchant and the second merchant are associated with distinct records in the payment processing service.

4. The system as claim 1 recites, wherein the first loan is issued by a payment processing service associated with the first merchant and the second loan is issued by an unrelated loan service.

5. The system as claim 1 recites, wherein repaying at least the portion of the first loan and at least the portion of the second loan comprises automatically repaying at least the portion of the first loan and at least the portion of the second loan without input from the buyer.

6. The system as claim 1 recites, the operations further comprising:
   receiving, prior to receiving the first request for the first loan, a third request for one or more merchants that offer the first item for sale and offer purchase finance loans via a loan service associated with a payment processing service;
   determining a plurality of merchants that offer the first item for sale and offer purchase finance loans;
   causing the plurality of merchants to be presented to the buyer; and receiving the first request for the first loan responsive to the buyer selecting the first merchant from the plurality of merchants.

7. The system as claim 6 recites, the operations further comprising determining the plurality of merchants based at least in part on a characteristic of the buyer.

8. The system as claim 1 recites, the operations further comprising:
   determining, prior to receiving the first request and based at least in part on a characteristic of the buyer, a plurality of merchants offering purchase finance loans via a loan service associated with a payment processing service;
   causing the plurality of merchants to be presented to the buyer; and
   receiving the first request for the first loan responsive to the buyer selecting the first merchant from the plurality of merchants.

9. The system as claim 1 recites, the operations further comprising:
   receiving a third request to authorize a payment instrument of the buyer for a total cost of a transaction between the buyer and the first merchant, the first item being purchased by the buyer from the first merchant via the transaction;
   authorizing the payment instrument for the total cost of the transaction;
   receiving, after authorizing the payment instrument for the total cost of the transaction, the first request for the first loan for the first item;
   generating the first loan responsive to receiving the first request; and
   refunding an amount associated with the first loan to the payment instrument.

10. A method, implemented at least in part by one or more server computing devices, the method comprising:
    training a machine-trained data model to allocate portions of a payment amount for making bundled payments on multiple loans, the training the machine-trained data model including accessing, in a data structure, training data including account information related to a plurality of transactions between a plurality of buyers and a plurality of merchants;
    receiving, from an application executing on a buyer computing device, a request for a first loan to enable a buyer to purchase a first item from a first merchant;
    generating the first loan based at least in part on determining that the buyer purchased the first item, wherein the first loan is associated with a first balance based on an actual purchase price of the first item;
    determining to bundle repayment of the first loan with repayment of at least a second loan of the buyer as a single payment from an account of the buyer;
    using the machine-trained data model to determine, based at least on account information of the buyer, an allocation of the single payment between repayment of at least a portion of the first loan and at least a portion of the second loan;
    automatically repaying, based on the allocation determined using the machine-trained data model, at least the portion of the first loan and at least the portion of the second loan via the single payment from the account of the buyer; and
    causing, at least in part, a graphical user interface (GUI) to be presented by the buyer computing device via the application, wherein the GUI presents an indication of the portion of the first loan and the portion of the second loan included for repayment in the single payment from the account of the buyer.

11. The method as claim 10 recites, further comprising generating the second loan based at least in part on determining that the buyer purchased a second item from a second merchant, wherein the second loan is associated with a second balance based on an actual purchase price of the second item.

12. The method as claim 10 recites, wherein the account of the buyer is managed by a payment processing service with which at least the first merchant is associated.

13. The method as claim 10 recites, further comprising:
    receiving, prior to receiving the request for the first loan, another request for one or more merchants that offer the first item for sale and offer purchase finance loans via a loan service associated with a payment processing service;
    determining, based at least in part on a characteristic of the buyer, a plurality of merchants that offer the first item for sale and offer purchase finance loans via the loan service;
    causing the plurality of merchants to be presented to the buyer; and
    receiving the request for the first loan responsive to the buyer selecting the first merchant from the plurality of merchants.

14. The method as claim 10 recites, further comprising:
    determining, based at least in part on a characteristic of the buyer, a plurality of merchants offering purchase finance loans via a loan service associated with a payment processing service;
    causing the plurality of merchants to be presented to the buyer; and
    receiving the request for the first loan responsive to the buyer selecting the first merchant from the plurality of merchants.

15. The method as claim 10 recites, further comprising determining, using another machine-trained data model, at least one of merchants or subsets of merchants that offer the first item for sale and that offer a loan for financing the first item via a payment processing service.

16. The method as claim 10 recites, further comprising:
    receiving, prior to receiving the request for the first loan, a request to authorize a payment instrument of the buyer for a total cost of a transaction between the buyer and the first merchant, the first item being purchased by the buyer from the first merchant via the transaction;
    authorizing the payment instrument for the total cost of the transaction;
    receiving, after authorizing the payment instrument for the total cost of the transaction, the request for the first loan;
    generating the first loan responsive to receiving the request for the first loan; and
    modifying a processed payment for the total cost of the transaction based at least in part on the first loan, wherein a final cost of the transaction satisfied by the payment instrument is less than the total cost of the transaction by an amount equal to the first balance.

17. A method comprising:
    training, by one or more processors, a machine-trained data model to allocate portions of a payment amount for making bundled payments on multiple loans, the training the machine-trained data model including accessing, in a data structure, training data including account information related to a plurality of transactions between a plurality of buyers and a plurality of merchants, wherein the one or more processors are associated with a payment processing service;

receiving, by the one or more processors, from an application executing on a buyer computing device, a request for a first loan to enable a buyer to purchase an item from a first merchant;

generating, by the one or more processors, the first loan based at least in part on determining that the buyer purchased the item, wherein the first loan is associated with a balance based on an actual purchase price of the item;

determining, by the one or more processors, to bundle repayment of the first loan with repayment of at least a second loan of the buyer as a single payment from an account of the buyer;

using, by the one or more processors, the machine-trained data model to determine, based at least on account information of the buyer, an allocation of the single payment between repayment of at least a portion of the first loan and at least a portion of the second loan;

automatically repaying, by the one or more processors, based on the allocation determined using the machine-trained data model, at least the portion of the first loan and at least the portion of the second loan via the single payment from the account of the buyer; and causing, at least in part, a graphical user interface (GUI) to be presented by the buyer computing device via the application, wherein the GUI presents an indication of the portion of the first loan and the portion of the second loan included for repayment in the single payment from the account of the buyer.

18. The method as claim 17 recites, wherein the GUI further includes:

a first representation associated with the first loan and at least one of details associated with the first loan or an indication of progress towards repayment of the first loan; and a second representation associated with the second loan and at least one of details associated with the second loan or an indication of progress towards repayment of the second purchase loan.

19. The method as claim 17 recites, wherein the request includes at least one of the item, an amount of the request, or an identifier associated with the first merchant.

20. The method as claim 17 recites, wherein the request comprises a first request, the method further comprising:

receiving a second request to authorize a payment instrument of the buyer for a total cost of a transaction between the buyer and the first merchant, the item being purchased by the buyer from the first merchant via the transaction;

authorizing the payment instrument for the total cost of the transaction;

receiving, after authorizing the payment instrument for the total cost of the transaction, the first request for the first loan for the item;

generating the first loan responsive to receiving the first request; and refunding an amount associated with the first loan to the payment instrument.

\* \* \* \* \*